US012531257B2

(12) United States Patent
Fukunishi et al.

(10) Patent No.: US 12,531,257 B2
(45) Date of Patent: Jan. 20, 2026

(54) OUTPUT INTEGRATION SYSTEM FOR A PLURALITY OF FUEL CELL ENGINES, AND FUEL CELL VEHICLE EQUIPPED WITH SUCH AN OUTPUT INTEGRATION SYSTEM

(71) Applicant: HONDA MOTOR CO., LTD., Tokyo (JP)

(72) Inventors: Yuki Fukunishi, Tokyo (JP); Shunichi Hirao, Wako (JP); Sohei Takeda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 538 days.

(21) Appl. No.: 18/077,475

(22) Filed: Dec. 8, 2022

(65) Prior Publication Data

US 2023/0187669 A1 Jun. 15, 2023

(30) Foreign Application Priority Data

Dec. 9, 2021 (JP) .................................. 2021-200064

(51) Int. Cl.
*H01M 8/04746* (2016.01)
*B60L 50/72* (2019.01)
*B60L 58/30* (2019.01)
*B60L 58/40* (2019.01)
*H01M 8/04082* (2016.01)
*H01M 8/04858* (2016.01)
*H01M 8/04992* (2016.01)

(52) U.S. Cl.
CPC ......... *H01M 8/04753* (2013.01); *B60L 50/72* (2019.02); *B60L 58/30* (2019.02); *B60L 58/40* (2019.02); *H01M 8/04201* (2013.01); *H01M 8/0494* (2013.01); *H01M 8/04992* (2013.01); *H01M 2250/20* (2013.01)

(58) Field of Classification Search
CPC ........... H01M 2220/20; H01M 16/006; H01M 2250/20; B60L 50/72; B60L 58/30; B60L 58/40; B60L 50/75; B60L 50/70; Y02E 60/50; Y02T 90/40
See application file for complete search history.

(56) References Cited

FOREIGN PATENT DOCUMENTS

| JP | 2012-164495 A | 8/2012 |
| JP | 2015-138760 A | 7/2015 |
| JP | 2016-119268 A | 6/2016 |

OTHER PUBLICATIONS

Kazunari, JP2015138760A; Espacenet machine translation, 2015 (Year: 2015).*
Office Action dated Aug. 22, 2023 issued in the corresponding Japanese Patent Application 2021-200064 with the English machine translation thereof.

* cited by examiner

*Primary Examiner* — Adam A Arciero
(74) *Attorney, Agent, or Firm* — Carrier, Shende & Associates P.C.; Joseph P. Carrier; Jeffrey T. Gedeon

(57) ABSTRACT

A generated electrical output of fuel cell stacks is adjusted, in a manner so that a difference in a residual amount of fuel in fuel tanks between fuel cell engines is reduced.

7 Claims, 8 Drawing Sheets

# OUTPUT INTEGRATION SYSTEM FOR A PLURALITY OF FUEL CELL ENGINES, AND FUEL CELL VEHICLE EQUIPPED WITH SUCH AN OUTPUT INTEGRATION SYSTEM

CROSS-REFERENCE TO RELATED APPLICATIONS

This application is based upon and claims the benefit of priority from Japanese Patent Application No. 2021-200064 filed on Dec. 9, 2021, the contents of which are incorporated herein by reference.

BACKGROUND OF THE INVENTION

Field of the Invention

The present invention relates to an output integration system for a plurality of fuel cell engines, and to a fuel cell vehicle equipped with such an output integration system.

Description of the Related Art

Recently, a fuel cell vehicle (FCV: Fuel Cell Vehicle) in which hydrogen is used as a fuel has been attracting attention as an automobile in which the environmental impact thereof is less than that of a gasoline vehicle. In such a fuel cell vehicle, air (including oxygen) and hydrogen gas, which serves as a fuel gas, are supplied to a fuel cell. The fuel cell vehicle travels by driving an electric motor using electrical power that is generated by the fuel cell. Therefore, such a fuel cell vehicle is considered to be an environmentally friendly vehicle, because it does not emit carbon dioxide ($CO_2$), NOx, SOx, or the like, but only emits water.

For example, in JP 2016-119268 A, there is disclosed a technology in relation to a high output system (referred to as an output integration system) which can be applied to a large scale vehicle such as a bus or the like, and which is equipped with a plurality of subsystems each having a fuel cell and a fuel tank (referred to as an engine).

In such a technique, in order to equalize the residual pressures of the fuel tanks of the respective engines, a correction is carried out in order to make a required output with respect to a first engine in which the residual output thereof is high to be larger than a required output with respect to a second engine in which the residual output thereof is low.

SUMMARY OF THE INVENTION

Incidentally, in the aforementioned correction, a correction ratio k0 per unit pressure difference is set in advance, and the pressure difference $\Delta P$ is multiplied by the correction ratio k0 to thereby calculate the correction ratio k ($k=k0 \times \Delta P$).

In addition, a required output after correction with respect to the first engine is calculated as "(1+k)×required output before correction", and a required output after correction with respect to the second engine is calculated as "(1−k)× required output before correction" (refer to paragraphs [0002], [0013], [0037], [0038], and [0041] of JP 2016-119268 A).

However, when the correction of the required output with respect to each of the engines is corrected by setting the correction ratio in accordance with a preset correction ratio, it is difficult to adjust the fuel gas consumption accurately in conformity with the operating conditions of an output integration system of high output.

The present invention has the object of solving the aforementioned problem.

An output integration system according to one aspect of the present invention is an output integration system for a plurality of fuel cell engines, the output integration system configured to integrate outputs from the plurality of fuel cell engines, wherein each of the fuel cell engines includes a fuel cell stack, a fuel tank configured to store a fuel gas supplied to the fuel cell stack, and a load configured to be supplied with electrical power from the fuel cell stack, and to generate a driving force, and the output integration system includes a control device provided at an interior or an exterior of the fuel cell engines, wherein the control device acquires a difference in a residual amount of fuel in the fuel tanks between the plurality of fuel cell engines, and adjusts a generated electrical output of each of the fuel cell stacks, so as to reduce the difference.

According to the present invention, the generated electrical output of the fuel cell stacks of each of the fuel cell engines is adjusted, in a manner so that a difference in the residual amount of fuel in the fuel tanks occurring between the fuel cell engines becomes minimal. Therefore, the residual amount of fuel in the fuel tanks of each of the fuel cell engines can be equalized. In accordance with this feature, the operable time period of the output integration system made up of the plurality of fuel cell engines can be lengthened.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Embodiment

[Configuration]

Figure 1:
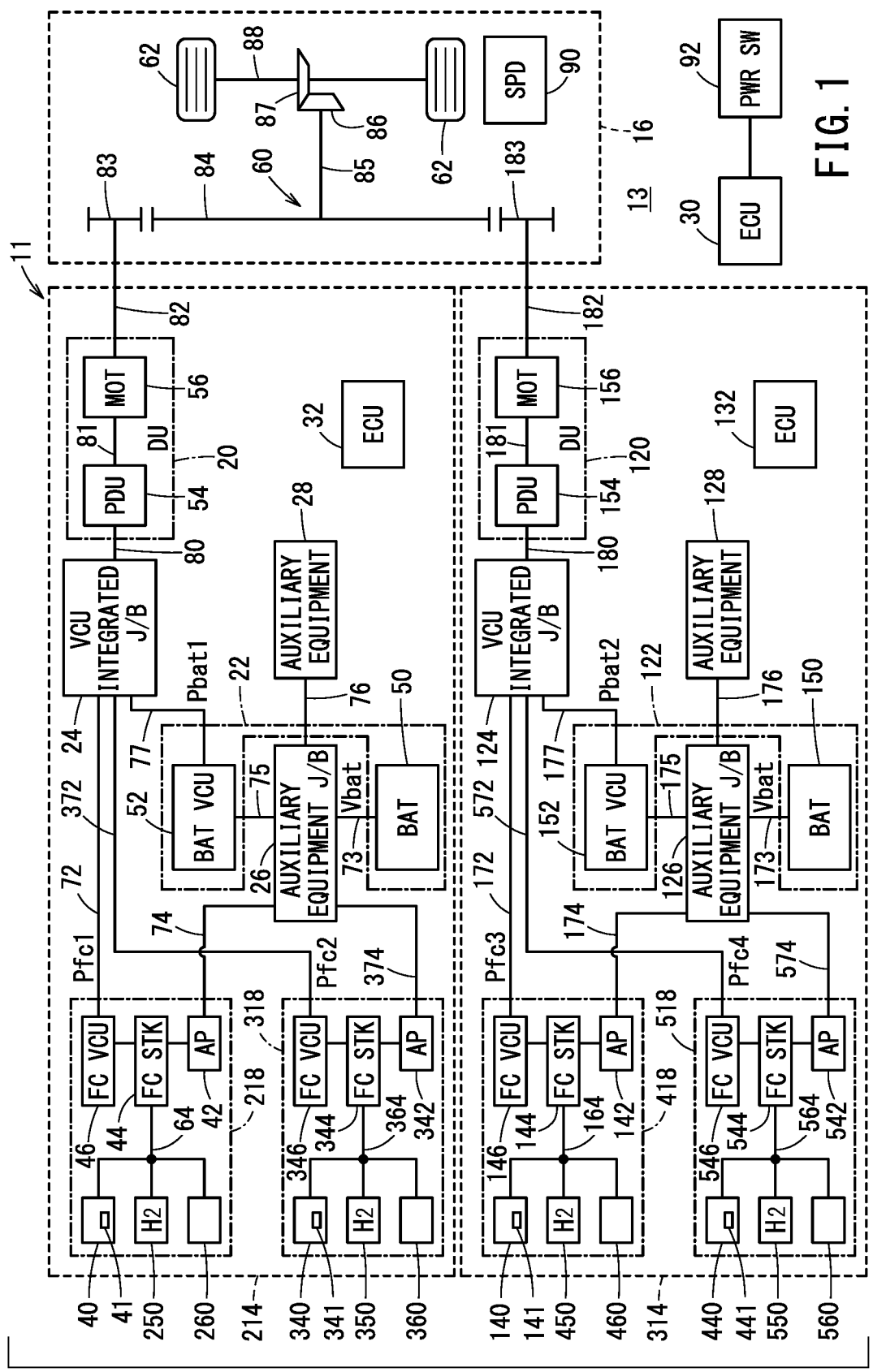
FIG. 1 is a schematic configuration diagram of a fuel cell vehicle according to an embodiment which is equipped with an output integration system for a fuel cell engine according to the embodiment.

FIG. 1 is a schematic configuration diagram of a fuel cell vehicle (referred to as a vehicle) 13 according to an embodiment which is equipped with an output integration system for a fuel cell engine (also simply referred to as an output integration system) 11 according to an embodiment.

As shown in FIG. 1, the fuel cell vehicle 13 is equipped with the output integration system 11, and a propulsion mechanism 16 that travels due to a driving force output from the output integration system 11.

The output integration system 11 includes a plurality, and in the present embodiment, two engines (also referred to as banks, fuel cell engines, or FC engines) 214 and 314. Three or more of such engines may be provided. This output integration system 11 is capable of generating a large driving force that can be applied to large scale vehicles such as trucks and buses or the like.

The one engine 214 is equipped with two FC systems (fuel cell systems) 218 and 318, a BAT system (battery system) 22, a load 20 (also referred to as a drive unit or a DU), an integrated connector (also referred to as a voltage control unit•junction box or a VCU integrated J/B) 24, an auxiliary equipment connector 26 (also referred to as an auxiliary equipment junction box or an auxiliary equipment J/B), auxiliary equipment 28, and a control device (also referred to as an ECU) 32.

The other engine 314 is equipped with two FC systems 418 and 518, a BAT system 122, a load 120, an integrated connector 124, an auxiliary equipment connector 126, auxiliary equipment 128, and a control device 132.

Moreover, it should be noted that the constituent elements of the engine 214 and the engine 314 are the same except for the constituent elements of their auxiliary equipment 28 and 128. In the auxiliary equipment 28 of the engine 214, there are included, for example, an in-vehicle air conditioner and an electric steering device, and in the auxiliary equipment 128 of the engine 314, differing from these features, there are included, for example, a heater for heating and a cargo compartment refrigerator. Accordingly, the electrical power consumption of the auxiliary equipment 28 and the auxiliary equipment 128 usually differ from each other.

Since the constituent elements of the engine 214 and the engine 314 are the same except for their auxiliary equipment 28 and 128, in order to avoid complexity, the one engine 214 will be described in detail below.

Figure 2:
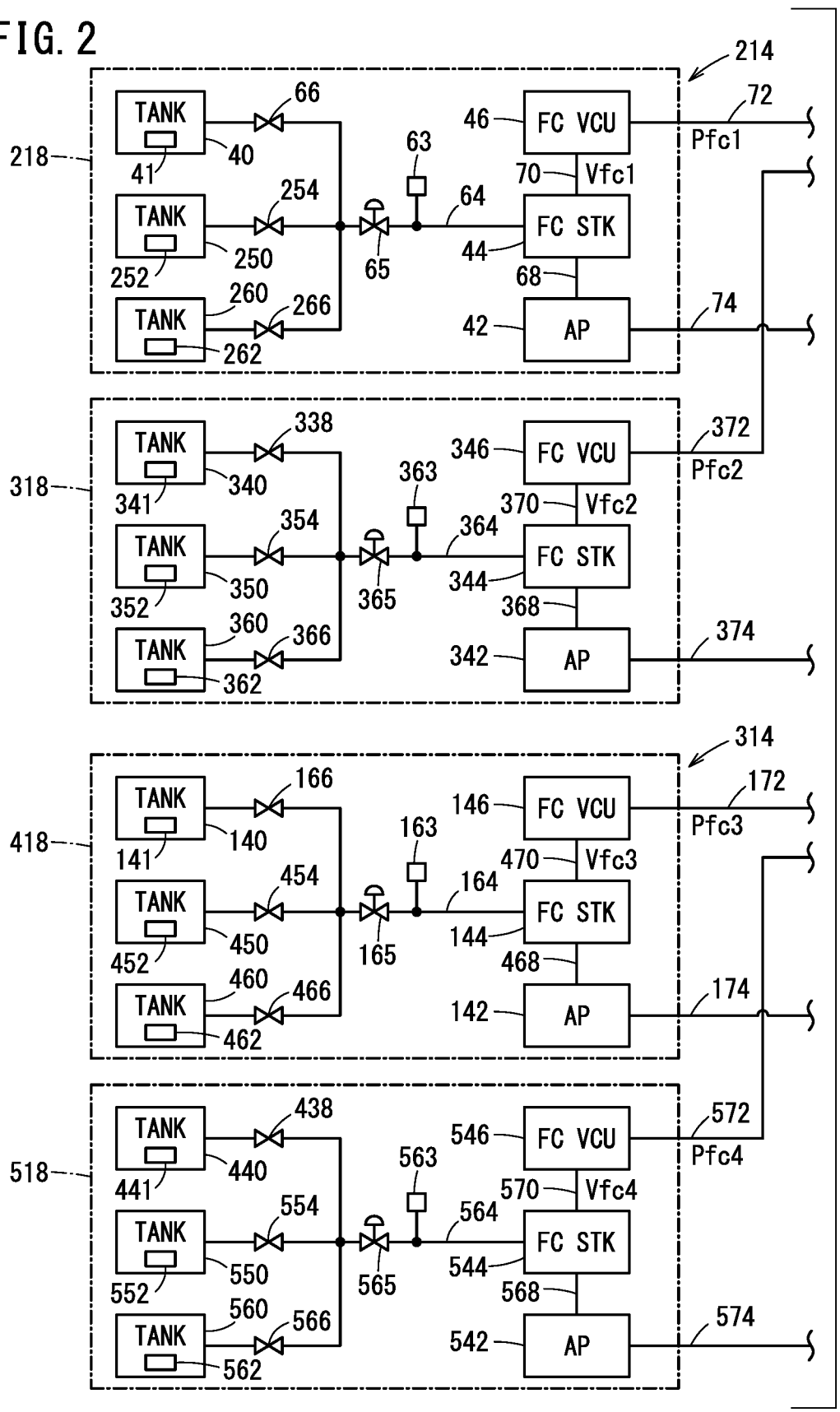
FIG. 2 is a detailed diagram showing, within FIG. 1, an internal configuration of each of respective fuel cell systems.

As shown in FIG. 2, the FC systems 218 and 318 of the engine 214 include, respectively, three fuel tanks 40, 250, and 260 and three fuel tanks 340, 350, and 360.

In order to facilitate convenience of understanding and calculation, the fuel tanks 40, 250, 260, 340, 350, and 360, including all of the fuel tanks (the embodiment and the exemplary modification) described below, are assumed to have the same shape/configuration (same volume) that can be filled with the same fully charged gas energy ($[J]=[Pa] \times [m^3]$).

The three fuel tanks 40, 250, and 260 and the fuel tanks 340, 350, and 360 are equipped respectively with pressure sensors 41, 252, and 262 and pressure sensors 341, 352, and 362 that function as residual amount of fuel sensors.

Passages (pipelines) 64 that communicate between the fuel tanks 40, 250, and 260 and an FC stack 44 of the FC system 218 allow the fuel gas to flow in a branching manner, and valves 66, 254, and 266 are arranged respectively.

A pressure sensor 63 and a pressure reducing valve (pressure reducing valve) 65 are arranged in the passage 64 of the FC system 218 sequentially in order from the side of the FC stack 44. The pressure sensor 63 measures the anode pressure Pa of the FC stack 44. The pressure reducing valve 65 is a regulating valve that maintains the anode pressure Pa of the FC stack 44 at a predetermined pressure which is lower than the pressure in the tanks 40, 250, and 260. The pressure reducing valve 65 may be replaced by an injector.

Similarly, pressure sensors 363, 163, and 563 and pressure reducing valves 365, 165, and 565 are arranged respectively in each of passages 364, 164, and 564 of the FC systems 318, 418, and 518 sequentially in order from the side of FC stacks 344, 144, and 544. The pressure sensors 363, 163, and 563 measure the respective anode pressures Pa of the FC stacks 344, 144, and 544. The pressure reducing valves 365, 165, and 565 are regulating valves. The pressure reducing valves 365, 165, and 565 are regulating valves that maintain the respective anode pressures Pa of the FC stacks 344, 144, 544 at a predetermined pressure which is lower than the pressure in the tanks 340 (350, 360), 140 (450, 460), and 440 (550, 560). The pressure reducing valves 365, 165, and 565 may be replaced respectively by injectors.

The FC systems 218, 318, 418, and 518 are each equipped, respectively, with air pumps (AP) 42, 342, 142, and 542 which communicate with the cathode inlet sides of the FC stacks 44, 344, 144, and 544 via passages 68, 368, 468, and 568.

The FC stacks 44, 344, 144, and 544 are equipped with FC converters (fuel cell voltage control units or FC VCUs) 46, 346, 146, and 546, which are voltage boosting converters.

The FC stacks 44 and 344 of the engine 214 are connected respectively to the input ends of the FC converters 46 and 346 through lines 70 and 370, and the output ends of the FC converters 46 and 346 are electrically connected to the integrated connector 24 (see FIG. 1) through lines 72 and 372.

The FC stacks 144 and 544 of the engine 314 are connected respectively to the input ends of the FC converters 146 and 546 through lines 470 and 570, and the output ends of the FC converters 146 and 546 are electrically connected to the integrated connector 124 (see FIG. 1) through lines 172 and 572.

The air pumps 42, 342, 142, and 542 supply an oxygen containing gas, which is compressed air (atmospheric air), to oxygen containing gas inlet passages (not shown) of the FC stacks 44, 344, 144, and 544 through the passages 68, 368, 468, and 568, respectively. The fuel tanks 40 (250, 260), 340 (350, 360), 140 (450, 460), and 440 (550, 560) supply the fuel gas to fuel gas inlet passages (not shown) of the FC stacks 44, 344, 144, 544, respectively, through the pressure reducing valves 65, 365, 165, and 565 and the passages 64, 364, 164, and 564.

The FC stacks 44, 344, 144, and 544 generate respective generated electrical powers Pfc (Pfc1, Pfc2, Pfc3, and Pfc4) by electrochemical reactions taking place between the oxygen containing gas distributed to the cathode flow paths (not shown) through the oxygen containing gas inlet passages (not shown) and the fuel gas distributed to the anode flow paths (not shown) through the fuel gas inlet passages (not shown) (for the sake of convenience, respective reference characters are provided at the output ends of the FC converters 46, 346, 146, and 546).

As shown in FIG. 2, generated voltages Vfc (Vfc1, Vfc2) of the FC stacks 44 and 344 of the engine 214 are boosted in voltage to a higher voltage by the FC converters 46 and 346, respectively, and are supplied as high-voltage generated electrical powers Pfc (Pfc1, Pfc2) to the first and second input terminals of the integrated connector 24 through the lines 72 and 372.

Generated voltages Vfc (Vfc3, Vfc4) of the FC stacks 144 and 544 of the engine 314 are boosted in voltage to a higher voltage by the FC converters 146 and 546, respectively, and are supplied as high-voltage generated electrical powers Pfc (Pfc3, Pfc4) to the first and second input terminals of the integrated connector 124 through the lines 172 and 572.

The FC converters 46, 346, 146, and 546 are voltage boosting converters capable of transmitting electrical power in only one voltage boosting direction from the FC stacks 44, 344, 144, and 544 toward the integrated connectors 24 and 124.

Returning to FIG. 1, the BAT system 22 of the engine 214 is equipped with an electrical power storage device (battery: BAT) 50, and a BAT converter (battery converter, battery voltage control unit: also referred to as a BAT VCU) 52 which is a step-up/step-down converter.

The BAT system 122 of the engine 314 is equipped with an electrical power storage device 150, and a BAT converter 152 which is a step-up/step-down converter.

The auxiliary equipment connector 26 of the engine 214 is connected, respectively, to the electrical power storage device 50 through a line 73, to the air pumps 42 and 342 through lines 74 and 374, to the BAT converter 52 through a line 75, and to the auxiliary equipment 28 through a line 76.

The BAT converter 52 is connected to the integrated connector 24 through a line 77.

The auxiliary equipment connector 126 of the engine 314 is connected, respectively, to the electrical power storage device 150 through a line 173, to the air pumps 142 and 542 through lines 174 and 574, to the BAT converter 152 through a line 175, and to the auxiliary equipment 128 through a line 176.

The BAT converter 152 is connected to the integrated connector 124 through a line 177.

The integrated connector 24 is connected to a DC end of an inverter 54 (also referred to as a power drive unit: PDU) through a line 80, and an AC end of the inverter 54 is connected to a motor 56 through a line 81.

Similarly, the integrated connector 124 is connected to an inverter 154 through a line 180, and the inverter 154 is connected to a motor 156 through a line 181.

In the engine 214, a stored voltage Vbat of the electrical power storage device 50 passes through the auxiliary equipment connector 26 via the line 73, and is supplied to the third input terminal of the integrated connector 24 via the line 77 as a high-voltage stored electrical power Pbat1 that is boosted in voltage through the BAT converter 52.

In the engine 314, a stored voltage Vbat of the electrical power storage device 150 passes through the auxiliary equipment connector 126 via the line 173, and is supplied to the third input terminal of the integrated connector 124 via the line 177 as a high-voltage stored electrical power Pbat2 that is boosted in voltage through the BAT converter 152.

The load 20 of the engine 214 comprises the inverter 54 and the motor (MOT) 56 which is a main machine.

The load 120 of the engine 314 comprises the inverter 154 and the motor 156 which is a main machine.

The generated electrical power Pfc generated by the FC stacks 44 and 344 of the engine 214 is supplied to the load 20 via the FC converters 46 and 346 and the integrated connector 24 at a time when the fuel cell vehicle 13 is traveling. At a time when the fuel cell vehicle 13 (the FC systems 218 and 318) is idling, the generated electrical power Pfc generated by the FC stacks 44 and 344 passes via the integrated connector 24, is converted into electrical power which is stepped down by the BAT converter 52, and charges (stores electricity in) the electrical power storage device 50 through the auxiliary equipment connector 26.

Similarly, the generated electrical power Pfc generated by the FC stacks 144 and 544 of the engine 314 is supplied to the load 120 via the FC converters 146 and 546 and the integrated connector 124 at a time when the fuel cell vehicle 13 is traveling. At a time when the fuel cell vehicle 13 (the FC systems 418 and 518) is idling, the generated electrical power Pfc generated by the FC stacks 144 and 544 passes via the integrated connector 124, is converted into electrical power which is stepped down by the BAT converter 152, and charges (stores electricity in) the electrical power storage device 150 through the auxiliary equipment connector 126.

The inverter 54 (154) converts a single phase DC electrical power into a three phase AC electrical power, and supplies the same to the motor 56 (156) through the line 81 (181).

A rotor (not shown) of the motor 56 (156) is rotated by the three-phase AC electrical power, and a main shaft 82 (182) of the motor 56 (156) connected to this rotor generates a rotational driving force.

The fuel cell vehicle 13 runs through the propulsion mechanism 16 due to a combined rotational driving force of the main shaft 82 of the motor 56 of the engine 214, and the main shaft 182 of the motor 156 of the engine 314.

Furthermore, at a time of decelerating when an accelerator pedal (not shown) of the fuel cell vehicle 13 is released, a regenerative electrical power of the motor 56 of the engine 214, after having been converted into a stepped-down electrical power through the inverter 54, the integrated connector 24, and the BAT converter 52, charges the electrical power storage device 50 through the auxiliary equipment connector 26.

Similarly, at a time of decelerating when an accelerator pedal (not shown) of the fuel cell vehicle 13 is released, a regenerative electrical power of the motor 156 of the engine 314, after having been made into a stepped-down electrical power through the inverter 154, the integrated connector 124, and the BAT converter 152, charges the electrical power storage device 150 through the auxiliary equipment connector 126.

More specifically, the BAT converters 52 and 152 are step-up/step-down converters (bi-directional converters) that are capable of switching between supplying electrical power in a stepped-up direction from the electrical power storage devices 50 and 150 to the loads 20 and 120, and supplying electrical power in a stepped-down direction from the FC systems 218, 318, 418, and 518 and/or the loads 20 and 120 to the electrical power storage devices 50 and 150.

In the engine 214, the air pumps 42 and 342 and the auxiliary equipment 28 are operated using the stored electrical power Pbat of the electrical power storage device 50 as input electrical power. In practice, the air pumps 42 and 342 also operate as auxiliary equipment, and therefore, hereinafter, when the electrical power of the auxiliary equipment 28 is calculated, the electrical power of the air pumps 42 and 342 is also included therein.

Similarly, in the engine 314, the air pumps 142 and 542 and the auxiliary equipment 128 are operated using the stored electrical power Pbat of the electrical power storage device 150 as input electrical power. In this case as well, the air pumps 142 and 542 also operate as auxiliary equipment, and therefore, hereinafter, when the electrical power of the auxiliary equipment 128 is calculated, the electrical power of the air pumps 142 and 542 is also included therein.

The electrical power storage devices 50 and 150 may be secondary batteries such as lithium ion batteries and/or capacitors.

The propulsion mechanism 16, which is connected to the main shaft 82 of the motor 56 of the engine 214 and the main shaft 182 of the motor 156 of the engine 314, is equipped with a speed reducing mechanism 60 and vehicle wheels 62.

The generated electrical power Pfc [W] and the stored electrical power Pbat [W] of each of the engines 214 and 314 are supplied to the loads 20 and 120, either separately or in an integrated (combined) manner through the integrated connectors 24 and 124. The inverters 54 and 154, at a time of so-called powered traveling, convert the DC electrical power into AC electrical power, and supply the same to the motors 56 and 156.

The AC electrical power rotates the motors 56 and 156, and the main shafts 82 and 182 generate the rotational driving force.

Gears 83 and 183 are enmeshed with a gear 84 in the propulsion mechanism 16. The gear 84 is connected to the vehicle wheels 62 via a drive shaft 85, differential gears 86 and 87, and an axle 88.

To explain in greater detail, the rotational driving force of the main shafts 82 and 182 of the motors 56 and 156 cause the vehicle wheels 62 and 62 to rotate through the speed reducing mechanism 60 (the gears 83, 183, and 84), the drive shaft 85, the differential gears 86 and 87, and the axle 88, which collectively constitute the propulsion mechanism 16. In this manner, the fuel cell vehicle 13 travels through the propulsion mechanism 16 due to the rotational driving force of the main shafts 82 and 182 of the motors 56 and 156.

A vehicle speed sensor (SPD) 90 serving as a vehicle speed acquisition unit that measures the vehicle speed VehSpd of the fuel cell vehicle 13 is placed on the drive shaft 85 or the vehicle wheels 62.

The one engine 214 is equipped with a control device 32. The other engine 314 is equipped with the control device 132. The fuel cell vehicle 13 is equipped with a control device 30.

Each of the control devices 30, 32, and 132 is constituted, respectively, by an ECU (Electronic Control Unit). The ECU is a computer including a microcomputer, and includes a CPU (central processing unit) as a processor, a ROM (including an EEPROM) as a memory, a RAM (random access memory), and apart therefrom, input/output devices such as an A/D converter and a D/A converter, and a timer serving as a timekeeping unit. The ECU functions as various function implementing units (function implementing means), for example, such as a control unit, a computation unit, and a processing unit, by one or more CPUs (processors) reading out and executing programs stored in the ROM. These functions can also be realized by hardware.

The control device 32 that controls the engine 214 is connected to each of the respective constituent elements that make up the engine 214 through non-illustrated signal lines and control lines. The control device 32, in addition to the pressure sensors 63, 41, 252, 262, 363, 341, 352, and 362, is connected to various sensors such as non-illustrated pressure sensors, voltage sensors, current sensors, temperature sensors, and rotational speed sensors.

Similarly, the control device 132 that controls the engine 314 is connected to each of the respective constituent elements that make up the engine 314 through non-illustrated signal lines and control lines. The control device 132, in addition to the pressure sensors 163, 141, 452, 462, 563, 441, 552, and 562, is connected to various sensors such as non-illustrated pressure sensors, voltage sensors, current sensors, temperature sensors, and rotational speed sensors.

The control devices 32 and 132 are connected by communication lines (not shown) to the control device (also referred to as a supervisory control device) 30 that controls the output integration system 11 and the fuel cell vehicle 13, and are capable of sharing mutual data and calculation results in real time by way of communication.

The control device 30, in addition to being connected to the vehicle speed sensor 90 and a power switch (PWR SW) 92, which is a power source ON/OFF switch of the fuel cell vehicle 13, is also connected respectively to switch sensors such as a non-illustrated accelerator pedal sensor and a brake pedal sensor, together with being connected to the propulsion mechanism 16 and a non-illustrated electric power steering device or the like.

The control devices 32 and 132 and the control device 30 execute programs stored in a storage device, and control the engines 214 and 314 and the propulsion mechanism 16 with the FC systems 218, 318, 418, and 518, the BAT systems 22 and 122, the auxiliary equipment 28 and 128, the integrated connectors 24 and 124, the auxiliary equipment connectors 26 and 126, and the loads 20 and 120, in accordance with the switched position of the switch, and the physical quantities detected by the sensors.

The control devices 32 and 132 may also be integrated together as one unit in the control device 30.

In order to avoid complexity and to facilitate understanding, in the following description, it is assumed that the output integration system 11 including the engines 214 and 314 and the fuel cell vehicle 13 which is equipped with the propulsion mechanism 16 are controlled by the integrated control device 30.

For example, the control device 30 is capable of setting the generated voltage Vfc (the generated current Ifc, the generated electrical power Pfc) of the FC stacks 44 and 344 by controlling the FC converters 46 and 346 on the basis of the stored voltage Vbat of the electrical power storage device 50.

Further, the control device 30 is capable of setting the generated voltage Vfc (the generated current Ifc, the generated electrical power Pfc) of the FC stacks 144 and 544 by controlling the FC converters 146 and 546 on the basis of the stored voltage Vbat of the electrical power storage device 150.

[Operations]

Next, a description will be given with reference to the flow charts shown in FIGS. 3 to 5 concerning operations of the fuel cell vehicle 13 according to the embodiment, which is equipped with the output integration system 11 according to the embodiment and is constituted basically in the manner described above. A controlling entity is the control device 30, unless otherwise specified.

Moreover, the present control is executed during a state in which the power switch 92 is in the ON position, and the FC system 218 (318, 418, or 518) is generating electrical power. In this case, the fuel cell vehicle 13 is in an operating state during traveling or during idling (referred to as a time of traveling or the like, or a time of operating). During idling, the FC system 218 (318, 418, or 518) is in a state of generating a small amount of electrical power.

At a time when electrical power is being generated such as at a time of traveling or the like, all of the valves 66, 254, 266, 338, 354, 366, 166, 454, 466, 438, 554, and 566 in order to supply the fuel gas from the fuel tanks 40, 250, 260, 340, 350, 360, 140, 450, 460, 440, 550, and 560 to the FC stacks 44, 344, 144, and 544 are opened.

Accordingly, the residual amount of fuel in each of the fuel tanks 40, 250, and 260, which are in communication with the FC stack 44 through the passage 64, will have the same residual amount of fuel. The residual amount of fuel in the FC system 218 can be measured only by the pressure sensor 41.

Similarly, the residual amount of fuel in each of the fuel tanks 340, 350, and 360, which are in communication with the FC stack 344 through the passage 364, will have the same residual amount of fuel. The residual amount of fuel in the FC system 318 can be measured only by the pressure sensor 341.

Further, the residual amount of fuel in each of the fuel tanks 140, 450, and 460, which are in communication with the FC stack 144 through the passage 164, will have the same residual amount of fuel. The residual amount of fuel in the FC system 418 can be measured only by the pressure sensor 141.

Furthermore, the residual amount of fuel in each of the fuel tanks 440, 550, and 560, which are in communication with the FC stack 544 through the passage 564, will have the same residual amount of fuel. The residual amount of fuel in the FC system 518 can be measured only by the pressure sensor 441.

In the engine 214, surplus electrical power generated during traveling and electrical power generated during idling is charged to the electrical power storage device 50 via the FC converters 46 and 346, the integrated connector 24, the BAT converter 52, and the auxiliary equipment connector 26. The stored electrical power Pbat1 in the electrical power storage device 50 is supplied to the air pumps 42 and 342 through the lines 74 and 374 via the auxiliary equipment connector 26, and to the various auxiliary equipment 28 through the line 76.

In the engine 314, surplus electrical power generated during traveling and electrical power generated during idling is charged to the electrical power storage device 150 via the FC converters 146 and 546, the integrated connector 124, the BAT converter 152, and the auxiliary equipment connector 126. The stored electrical power Pbat2 in the electrical power storage device 150 is supplied to the air pumps 142 and 542 through the lines 174 and 574 via the auxiliary equipment connector 126, and to the various auxiliary equipment 128 through the line 176.

Moreover, in the following description, in the case that one individual index [ ], and in the case of there being two individual instances of such indexes as in [ ][ ] being applied to the end of the reference numerals, each of the indexes includes the following meanings described below.

One individual instance of the index [0] indicates the side of the engine 214.

In the case of two individual instances of the indexes [0][0], the index [0] on the right side indicates the side of the engine 214, and the index [0] on the left side indicates the FC system 218.

In the case of two individual instances of the indexes [1][0], the index [0] on the right side indicates the side of the engine 214, and the index [1] on the left side indicates the FC system 318.

One individual instance of the index [1] indicates the side of the engine 314.

In the case of two individual instances of the indexes [0][1], the index [1] on the right side indicates the side of the engine 314, and the index [0] on the left side indicates the FC system 418.

In the case of two individual instances of the indexes [1][1], the index [1] on the right side indicates the side of the engine 314, and the index [1] on the left side indicates the FC system 518.

Further, [W] indicates a unit of electrical power, and [Pa] indicates a unit of pressure.

Figure 3:
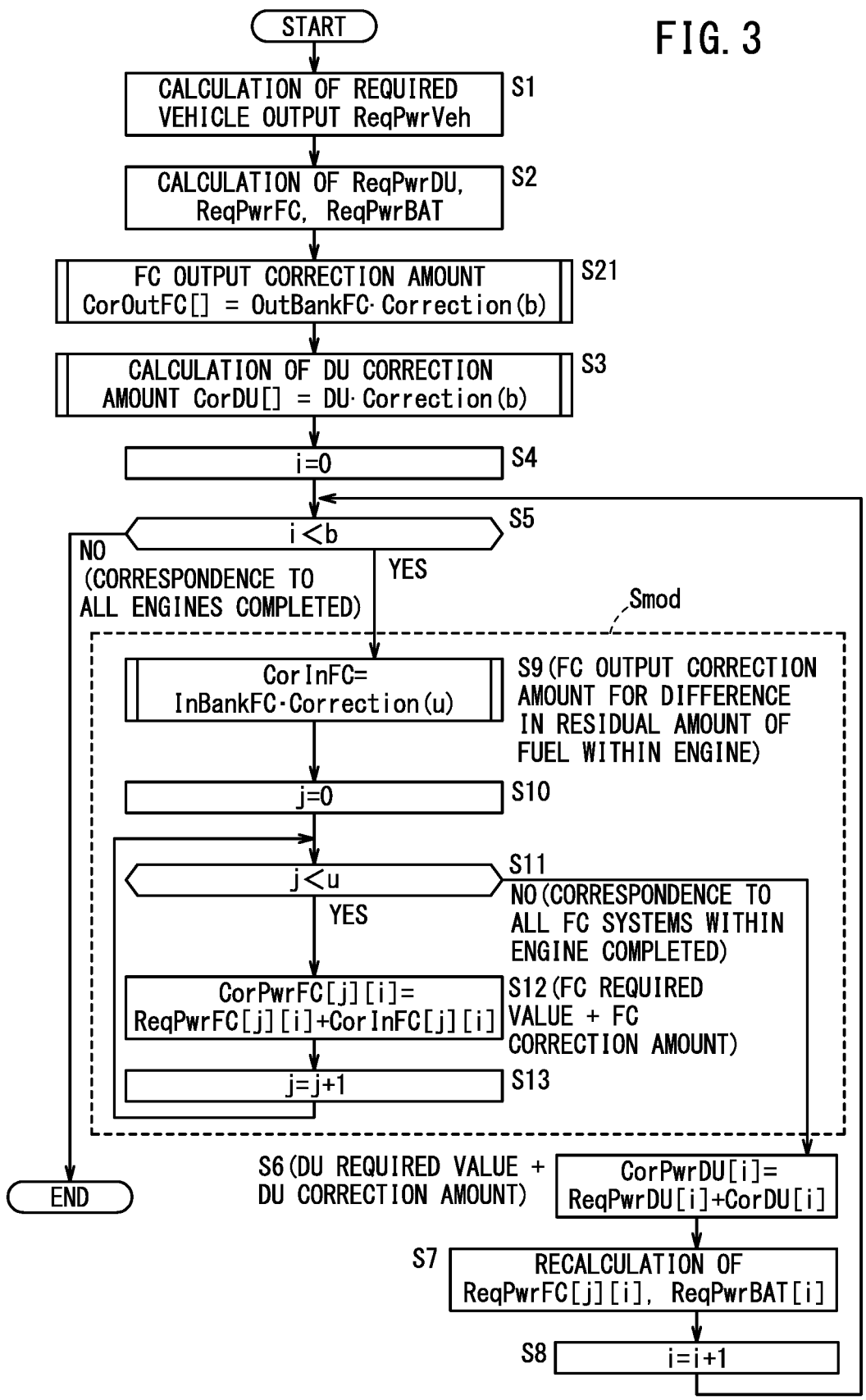
FIG. 3 is a flow chart provided in order to describe operations of the embodiment shown in FIG. 1.

In step S1 of FIG. 3, the control device 30 calculates the required output (required vehicle output, required driving force, required vehicle driving force) ReqPwrVeh [W] of the propulsion mechanism 16 of the fuel cell vehicle 13. The required output ReqPwrVeh of the fuel cell vehicle 13 is calculated based on, for example, the current vehicle speed VehSpd as measured by the vehicle speed sensor 90, a slope of the road, and a target vehicle speed calculated from a degree of opening of the accelerator pedal or the like.

In step S2 of FIG. 3, as shown in formula (1), the required output (load output) ReqPwrDU[0] for the load 20, and the required output (load output) ReqPwrDU[1] for the load 120 are calculated (distributed), in a manner so that the combined output (total output) of both of the engines 214 and 314 can cover the required output ReqPwrVeh [W] of the fuel cell vehicle 13.

$$ReqPwrVeh=ReqPwrDU[0]+ReqPwrDU[1] \quad (1)$$

At the same time, in step S2 of FIG. 3, as shown in formula (2), the generated electrical output (required generated electrical output, FC output) ReqPwrFC[0][0] of the FC system 218, the generated electrical output ReqPwrFC[1][0] of the FC system 318, and the required electrical power storage output (electrical power storage output) ReqPwrBAT[0] of the BAT system 22, which cover the required output ReqPwrDU[0] [W] of the load 20, are calculated.

$$ReqPwrDU[0]=ReqPwrFC[0][0]+ReqPwrFC[1][0]+ReqPwrBAT[0] \quad (2)$$

At the same time, in step S2 of FIG. 3, as shown in formula (3), the required generated electrical output ReqPwrFC[0][1] of the FC system 418, the required generated electrical output ReqPwrFC[1][1] of the FC system 518, and the required electrical power storage output ReqPwrBAT[1] of the BAT system 122, which cover the required output ReqPwrDU[1] [W] of the load 120, are calculated.

$$ReqPwrDU[1]=ReqPwrFC[0][1]+ReqPwrFC[1][1]+ReqPwrBAT[1] \quad (3)$$

Next, in step S21 of FIG. 3, a determination is made as to whether or not a correction process (inter-engine FC output correction process) between the engines 214 and 314 is necessary in order to decrease or eliminate the difference in the residual amount of fuel between the total residual amount of fuel in the fuel tanks 40, 250, 260, 340, 350, and 360 of the engine 214, and the total residual amount of fuel in the fuel tanks 140, 450, 460, 440, 550, and 560 of the engine 314.

In order to perform this determination, an FC output correction amount OutBankFC•Correction(b) (where b is the number of the engines. In the present embodiment, since there are the engine 214 and the engine 314, the number of the engines b is b=2), which is made up from the FC output correction amount CorOutFC[0] of the FC systems 218 and 318 on the side of the engine 214 and the FC output correction amount CorOutFC[1] of the FC systems 418 and 518 on the side of the engine 314, is calculated.

Moreover, the FC output correction process (the inter-engine FC output correction process) between the engines 214 and 314 is a process that is carried out in order to decrease or eliminate (equalize) a difference in the residual amount of fuel between the total residual amount of fuel of the fuel tanks 40, 250, 260, 340, 350, and 360 of the engine 214, and the total residual amount of fuel in the fuel tanks 140, 450, 460, 440, 550, and 560 of the engine 314 during generation of electrical power by the FC systems 218, 318, 418, and 518 of the fuel cell vehicle 13, by correcting (adjusting) a distributed amount of the generated electrical power of the FC system 218 (318) and the FC system 418 (518).

To describe the inter-engine FC output correction process for the difference in the residual amount of fuel in step S21 in slightly greater detail, if from among both of the engines 214 and 314, one of the engines in which the residual amount of fuel remaining therein is large is assumed to be the engine 214, then in order to quickly reduce the total residual amount of fuel in the fuel tanks 40, 250, 260, 340, 350, and 360 of the one engine 214, there is a process of relatively increasing the generated electrical power (generated electrical output) Pfc (FC output ReqPwrFC[0]) of the fuel cell system 218 (318) of the one engine 214 in which the total residual amount of fuel remaining therein is large, while on the other hand, in order to delay the reduction in the total residual amount of fuel in the fuel tanks 140, 450, 460, 440, 550, and 560 of the other engine 314 in which the total residual amount of fuel is small, there is a process of relatively reducing the generated electrical power (FC output ReqPwrFC[1]) of the fuel cell system 418 (518) of the other engine 314 in which the total residual amount of fuel is small.

In the foregoing manner, by carrying out the control (process) on the generated electrical power (Pfc1+Pfc2=FC output ReqPwrFC[0]) of the engine 214 and the generated electrical power (Pfc3+Pfc4=FC output ReqPwrFC[1]) of the engine 314 in a complementary (offsetting) manner, the difference between the total residual amount of fuel in the fuel tanks 40, 250, 260, 340, 350, and 360 of the one engine 214 and the total residual amount of fuel in the fuel tanks 140, 450, 460, 440, 550, and 560 of the other engine 314 can be reduced over time.

Figure 4:
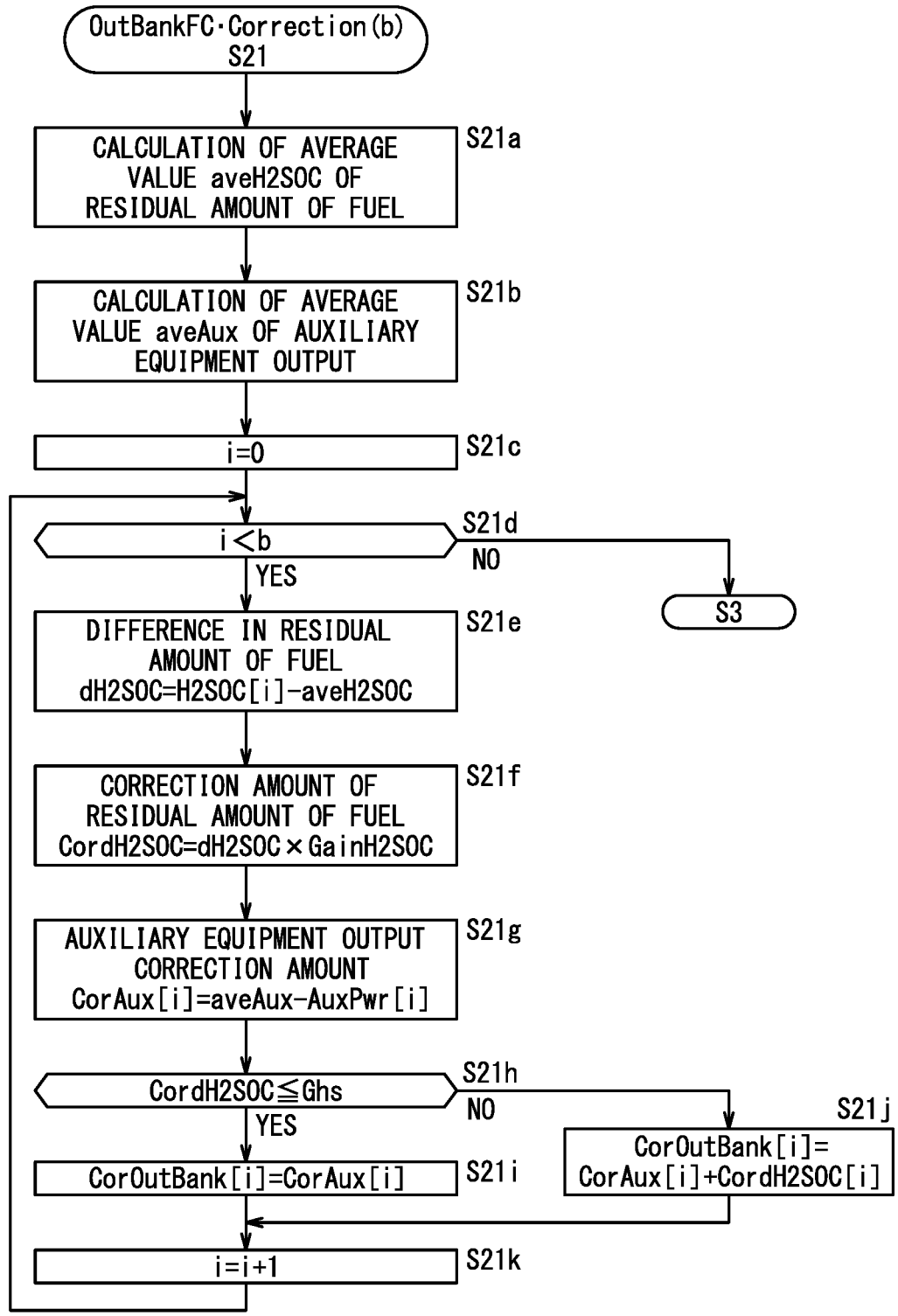
FIG. 4 is a flow chart showing details of a process of calculating a fuel cell output correction amount in order to reduce or eliminate a difference in a residual amount of fuel between the engines in step S21 of FIG. 3 and FIG. 8.

FIG. 4 is a detailed flow chart provided in relation to a process, in step S21 of FIG. 3, of calculating the FC output correction amount CorOutFC[ ]=OutBankFC•Correction(b) (where b indicates the number of the engines) in order to correct (adjust) each of the generated electrical powers Pfc, which are output electrical powers of the fuel cell system 218 (318) and the fuel cell system 418 (518), for the purpose of reducing the difference in the residual amount of fuel (total residual amount of fuel) between the engines 214 and 314.

In step S21a of FIG. 4, the average value aveH2SOC [Pa] of the residual amount of fuel is calculated based on the pressure detected by the pressure sensors 41 and 341 (the residual amount of fuel H2SOC[0] (the total residual amount of fuel of the engine 214)) and the pressure detected by the pressure sensors 141 and 441 (the residual amount of fuel H2SOC[1] (the total residual amount of fuel of the engine 314)).

Moreover, although a unit of the residual amount of fuel is a unit of energy [J]=[Pa]×[m³], since the volume [m³] of the fuel tanks 40, 250, 260, 340, 350, 360, 140, 450, 460, 440, 550, and 560 is the same, a description will be given in which the residual amount of fuel is replaced by a pressure (in units of [Pa]) (the same applies hereinafter).

As shown in formula (4), the average value aveH2SOC [Pa] of the residual amount of fuel is calculated as an average of the total residual amount of fuel H2SOC[0] [Pa] in the fuel tanks 40, 250, 260, 340, 350, and 360 of the engine 214, and the total residual amount of fuel H2SOC[1] [Pa] in the fuel tanks 140, 450, 460, 440, 550, and 560 of the engine 314.

$$aveH2SOC=(H2SOC[0]+H2SOC[1])/2 \quad (4)$$

In step S21b, from the detected values of the non-illustrated voltage sensors and the current sensors, the output AuxPwr[0] of the auxiliary equipment 28 of the engine 214, and the output AuxPwr[1] of the auxiliary equipment 128 of the engine 314 are acquired, and as shown in formula (5), the average value aveAux [W] of the auxiliary equipment output, which is an average value, is calculated.

$$aveAux=(AuxPwr[0]+AuxPwr[1])/2 \quad (5)$$

In this instance, in the flow chart as well, the index of the engines 214 and 314 are designated by i (where i=0 and 1), and the number of the engines of the output integration system 11 is designated by b (where b=2) (the engine 214 and the engine 314).

In step S21c, the index i is set to i=0 (the engine 214).

In step S21d, a determination is made as to whether or not the index i is less than the engine number b (i<b).

In the first instance of this determination, since (0<2), step S21d is affirmative (step S21d: YES), and the process proceeds to step S21e.

In step S21e, the difference in the residual amount of fuel dH2SOC [Pa] of the engine 214 whose index i is i=0 is calculated by formula (6).

$$dH2SOC[0] = H2SOC[i] - aveH2SOC \quad (6)$$
$$= H2SOC[0] - aveH2SOC$$

Stated otherwise, the difference in the residual amount of fuel dH2SOC of the engine 214 is calculated as a value obtained by subtracting the average value aveH2SOC of the residual amount of fuel (step S21a) from the total residual amount of fuel H2SOC[0] in the fuel tanks 40, 250, 260, 340, 350, and 360 of the engine 214 specified by the index i (i=0).

Next, in step S21f, a correction amount CordH2SOC[0] [W] of the residual amount of fuel (adjustment amount of the residual amount of fuel) in order to correct (adjust) the difference in the residual amount of fuel dH2SOC[0] [Pa] calculated in step S21e by the two fuel cell systems 218 and 318 that make up the engine 214 is calculated (converted) by formula (7).

$$CordH2SOC[0]=dH2SOC \times GainH2SOC \quad (7)$$

In this instance, the GainH2SOC [W/Pa] is a corrective gain (conversion factor), and is a ratio (ΔDU/ΔH2) between a unit fuel increment ΔH2 [Pa] of the fuel gas within the FC stacks 44 (344), which is supplied from the fuel tanks 40, 250, and 260 (340, 350, and 360) through the pressure reducing valves 65 (365), and a unit output increment ΔDU [W] for the loads 20. Such a ratio (ΔDU/ΔH2) is measured in advance as a characteristic (map) of an incremental function, and is recorded as a map in the storage device of the control device 30 (32).

Even if the ratios are of different values between the fuel cell system 218 and the fuel cell system 318, it is possible to carry out a control to reduce or eliminate the difference in the residual amount of fuel.

Next, in step S21g, the auxiliary equipment output correction amount CorAux[0] [W] of the auxiliary equipment 28 is calculated by formula (8) as a difference in the auxiliary equipment output of the engine 214.

$$CorAux[0] = aveAux - AuxPwr[i] \qquad (8)$$
$$= aveAux - AuxPwr[0]$$

Stated otherwise, the auxiliary equipment output correction amount CorAux[0] of the engine 214 is calculated as a value obtained by subtracting the output AuxPwr[0] of the auxiliary equipment 28 of the engine 214 specified by the index i (i=0) from the average value aveAux of the auxiliary equipment output, which is the average value of the auxiliary equipment output AuxPwr[0] of the auxiliary equipment 28 of the engine 214 (including the input electrical power of the air pumps 42 and 342), and the auxiliary equipment output AuxPwr[1] of the auxiliary equipment 128 of the engine 314 (including the input electrical power of the air pumps 142 and 542).

Next, in step S21h, by means of the inequality (9), a determination is made as to whether or not the correction amount CordH2SOC[0] of the residual amount of fuel of the engine 214 is less than or equal to a predetermined threshold value Ghs [Pa].

$$CordH2SOC[0] \leq Ghs \qquad (9)$$

In the case of being less than or equal to the threshold value Ghs (step S21h: YES), it is assumed that the correction amount CordH2SOC[0] of the residual amount of fuel is small, and the difference in the residual amount of fuel is small.

In this case, in step S21i, the correction amount (engine correction amount) CorOutBank[0] [W] of the engine 214 is set to only the auxiliary equipment output correction amount CorAux[0] with respect to the auxiliary equipment 28, as shown in formula (10).

$$CorOutBank[0] = CorAux[0] \qquad (10)$$

On the other hand, in the case of being greater than the threshold value Ghs (step S21h: NO), then in step S21j, the engine correction amount CorOutBank[0] [W] with respect to the engine 214 is set, as shown in formula (11), to a value obtained by adding the auxiliary equipment output correction amount CorAux[0] with respect to the auxiliary equipment 28 calculated in step S21g, and the correction amount CordH2SOC[0] of the residual amount of fuel calculated in step S21f.

$$CorOutBank[0] = CorAux[0] + CordH2SOC[0] \qquad (11)$$

More specifically, in the case that the correction amount CordH2SOC[0] of the residual amount of fuel exceeds the threshold value Ghs (step S21h: NO), the engine correction amount CorOutBank[0] is set to a total correction amount of the auxiliary equipment output correction amount CorAux[0] and the correction amount CordH2SOC[0] of the residual amount of fuel.

In actuality, at this time, substantially simultaneously therewith, the correction (adjustment) of the correction amount CorOutBank[1], which will be described next, is placed (or set) in a state that is capable of being implemented with respect to the fuel cell systems 418 and 518 of the other engine 314.

More specifically, in step S21k, while incrementing the index i by 1 in a manner so that i=i+1=0+1=1 (the engine 314), execution of the process in relation to the side of the engine 314 is carried out from step S21d: (1<2): YES→step S21e→step S21f {correction amount CordH2SOC[1] of the residual amount of fuel}→step S21g {auxiliary equipment output correction amount CorAux[1]=aveAux−AuxPwr[1]}→step S21h→(step S21i or step S21j). In accordance with this feature, in step S21j, the engine correction amount CorOutBank[1] [W] with respect to the engine 314 is calculated as shown in formula (12).

$$CorOutBank[1] = CorAux[1] + CordH2SOC[1] \qquad (12)$$

Next, when (i=2) is set in step S21k, the determination of step S21d (where i=2 and b=2, i<b?) becomes negative (step S21d: NO), and the process proceeds to step S3 of FIG. 3.

Next, in step S3 of FIG. 3, with respect to the required outputs ReqPwrDU[0] and ReqPwrDU[1] of the loads 20 and 120, a determination is made as to whether or not a correction process (DU correction process) between the engines 214 and 314, which will be described next, is necessary. For this purpose, a load correction amount (also referred to as a DU correction amount) CorDU [W]=DU·Correction(b) is calculated. In this instance, the "b" in DU·Correction(b) is the number of the engines of the output integration system 11, which in the present embodiment, is two, namely the engines 214 and 314, and therefore, "b"=2.

Moreover, the DU correction process between the engines 214 and 314 is a process that is carried out in order to eliminate or reduce (equalize) a difference between the total residual amount of fuel in the fuel tanks (40, 250, 260, 340, 350, and 360) of the engine 214 and the total residual amount of fuel in the fuel tanks (140, 450, 460, 440, 550, and 560) of the engine 314 during generation of electrical power by the FC systems 218, 318, 418, and 518 of the fuel cell vehicle 13, by correcting (adjusting) a distributed amount of the output electrical power for the loads 20 (120).

To describe the DU correction process between the engines 214 and 314 in slightly greater detail, within the engines 214 and 314, in order to quickly reduce the total residual amount of fuel in the fuel tanks of one of the engines in which the total residual amount of fuel remaining therein is large, there is a process of relatively increasing the load (DU) output ReqPwrDU[ ] of the one engine in which the total residual amount of fuel remaining therein is large, while on the other hand, in order to delay the reduction in the total residual amount of fuel in the fuel tanks of the other engine in which the total residual amount of fuel is small, there is a process of relatively reducing the load (DU) output ReqPwrDU[ ] of the other engine in which the total residual amount of fuel is small.

In this manner, by controlling (processing) the load (DU) output ReqPwrDU[0] of the engine 214 and the load (DU) output ReqPwrDU[1] of the engine 314 in a complementary (offsetting) manner, a difference between the residual amount of fuel in the fuel tanks {for example, the total residual amount of fuel in the fuel tanks (40, 250, 260, 340, 350, and 360)} of the one engine and the residual amount of fuel in the fuel tanks {hence, the total residual amount of fuel in the fuel tanks (140, 450, 460, 440, 550, and 560)} of the other engine can be reduced over time while the combined output of the output integration system 11 (the required output ReqPwrVeh) remains unchanged (while being maintained at a constant value).

Figure 5:
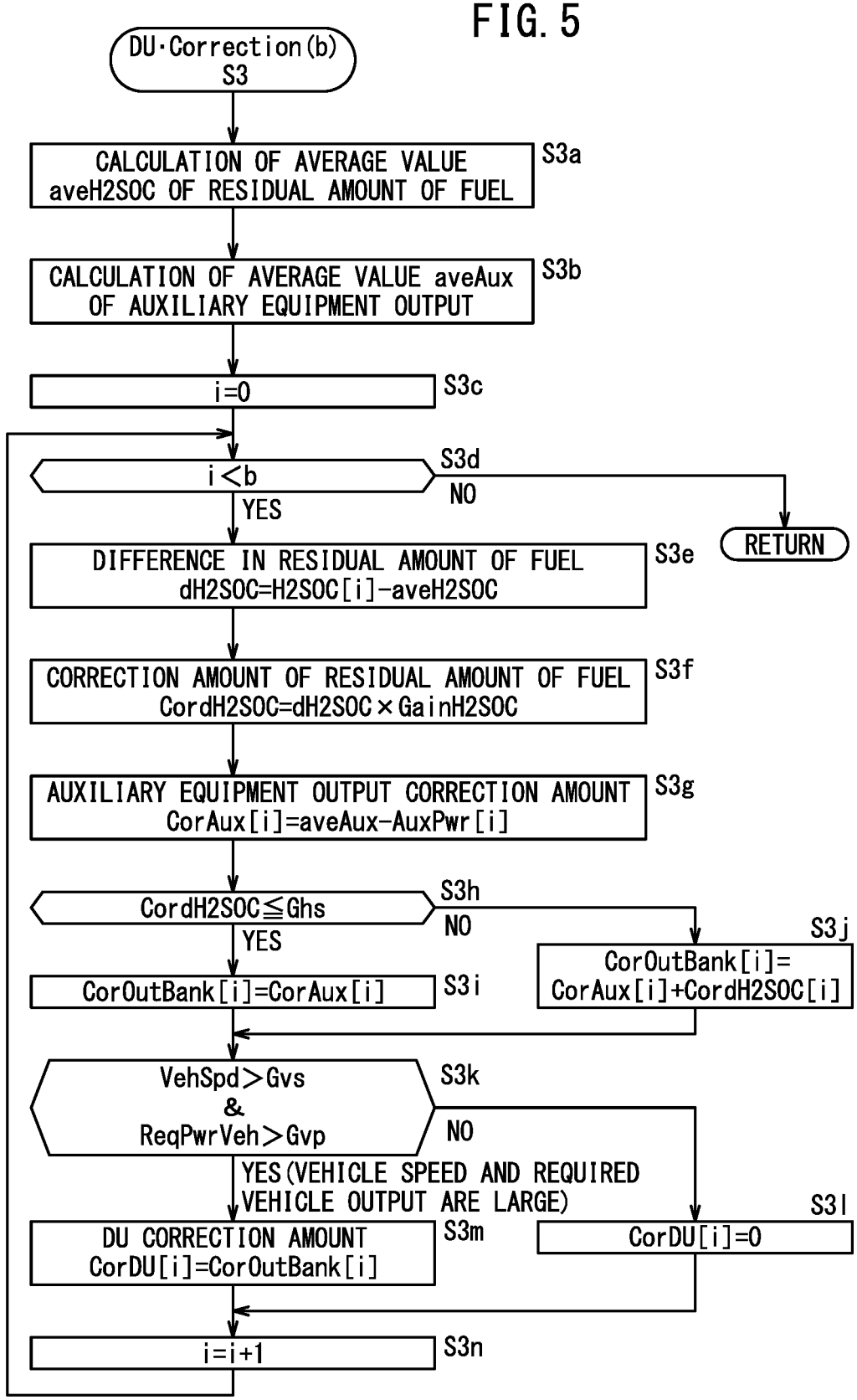
FIG. 5 is a flow chart showing details of a process of calculating a load correction amount in order to reduce or eliminate a difference in a residual amount of fuel between the engines in step S3 of FIG. 3 and FIG. 8.

FIG. 5 is a detailed flow chart provided in relation to a process of calculating the load correction amount CorDU=DU·Correction[b] (where b indicates the number of the engines) in order to correct (adjust) the output electrical power of the load (DU) 20 (120), for the purpose of reducing the difference in the residual amount of fuel between the engines 214 and 314 in step S3 of FIG. 3.

In step S3*a* of FIG. 5, in the same manner as in step S21*a* of FIG. 4, the average value aveH2SOC [Pa] of the residual amount of fuel is calculated based on the pressure detected by the pressure sensors 41 and 341 {the residual amount of fuel H2SOC[0] (the total residual amount of fuel of the engine 214)}, and the pressure detected by the pressure sensors 141 and 441 {the residual amount of fuel H2SOC[1] (the total residual amount of fuel of the engine 314)}.

As shown in the restated formula (4), the average value aveH2SOC of the residual amount of fuel is calculated as an average of the total residual amount of fuel H2SOC[0] [Pa] in the fuel tanks 40, 250, 260, 340, 350, and 360 of the engine 214, and the residual amount of fuel H2SOC [1] [Pa] in the fuel tanks 140, 450, 460, 440, 550, and 560 of the engine 314.

$$aveH2SOC = (H2SOC[0] + H2SOC[1])/2 \tag{4}$$

In step S3*b*, in the same manner as in step S21*b*, from the detected values of the non-illustrated voltage sensors and the current sensors, the output AuxPwr[0] of the auxiliary equipment 28 of the engine 214, and the output AuxPwr[1] of the auxiliary equipment 128 of the engine 314 are acquired, and as shown in the restated formula (5), the average value aveAux [W] of the auxiliary equipment output, which is an average value, is calculated.

$$aveAux = (AuxPwr[0] + AuxPwr[1])/2 \tag{5}$$

In step S3*c*, the index i is set to i=0 (the engine 214).

In step S3*d*, a determination is made as to whether or not the index i is less than the engine number b (i<b).

In the first instance of this determination, since (0<2), step S3*d* is affirmative (step S3*d*: YES), and the process proceeds to step S3*e*.

In step S3*e*, the difference in the residual amount of fuel dH2SOC [Pa] of the engine 214 whose index i is i=0 is calculated by the restated formula (6).

$$dH2SOC[0] = H2SOC[i] - aveH2SOC \tag{6}$$
$$= H2SOC[0] - aveH2SOC$$

Next, in step S3*f*, a correction amount CordH2SOC[0] [W] of the residual amount of fuel (adjustment amount of the residual amount of fuel) in order to correct (adjust) the difference in the residual amount of fuel dH2SOC[0] [Pa] of the engine 214 calculated in step S3*e* by the load 20 of the engine 214 is calculated (converted) by the restated formula (7).

$$CordH2SOC[0] = dH2SOC \times GainH2SOC \tag{7}$$

In this instance, the GainH2SOC [W/Pa] is a corrective gain (conversion factor), and is a ratio ($\Delta DU/\Delta H2$) between a unit fuel increment $\Delta H2$ [Pa] of the fuel gas within the FC stacks 44 (344), which is supplied from the fuel tanks 40, 250, and 260 (340, 350, and 360) through the pressure reducing valves 65 (365), and a unit output increment $\Delta DU$ [W] for the loads 20. Such a ratio ($\Delta DU/\Delta H2$) is measured in advance as a characteristic (map) of an incremental function, and is recorded as a map in the storage device of the control device 30 (32).

Even if the ratios ($\Delta DU/\Delta H2$) are of different values between the fuel cell system 218 and the fuel cell system 318, it is possible to carry out a control to reduce or eliminate the difference in the residual amount of fuel.

In order to facilitate understanding, such a ratio ($\Delta DU/\Delta H2$) shall be taken to be the same value as the ratio ($\Delta DU/\Delta H2$) in the aforementioned step S21*f*.

Next, in step S3*g*, in the same manner as in step S21*g*, the auxiliary equipment output correction amount CorAux[0] [W] of the auxiliary equipment 28 is calculated by the restated formula (8) as a difference in the auxiliary equipment output of the engine 214.

$$CorAux[0] = aveAux - AuxPwr[i] \tag{8}$$
$$= aveAux - AuxPwr[0]$$

Next, in step S3*h*, by means of the restated inequality (9), a determination is made as to whether or not the correction amount CordH2SOC of the residual amount of fuel is less than or equal to a predetermined threshold value Ghs [Pa].

$$CordH2SOC \leq Ghs \tag{9}$$

In the case of being less than or equal to the threshold value Ghs (step S3*h*: YES), it is assumed that the correction amount CordH2SOC[0] of the residual amount of fuel is small, and the difference in the residual amount of fuel is small.

In this case, in step S3*i*, the correction amount CorOutBank[0] [W] of the engine 214 is set to only the auxiliary equipment output correction amount CorAux[0] with respect to the auxiliary equipment 28, as shown in the restated formula (10).

$$CorOutBank[0] = CorAux[0] \tag{10}$$

On the other hand, in the case of being greater than the threshold value Ghs (step S3*h*: NO), then in step S3*j*, the engine correction amount CorOutBank[0] [W] with respect to the engine 214 is set, as shown in the restated formula (11), to a value obtained by adding the auxiliary equipment output correction amount CorAux[0] with respect to the auxiliary equipment 28 calculated in step S3*g*, and the correction amount CordH2SOC[0] of the residual amount of fuel calculated in step S3*f*.

$$CorOutBank[0] = CorAux[0] + CordH2SOC[0] \tag{11}$$

More specifically, in the case that the correction amount CordH2SOC[0] of the residual amount of fuel exceeds the threshold value Ghs (step S3*h*: NO), the engine correction amount CorOutBank[0] is set to a total correction amount of the auxiliary equipment output correction amount CorAux [0] and the correction amount CordH2SOC[0] of the residual amount of fuel.

Next, in step S3*k*, as shown in formula (13), a determination is made as to whether or not the vehicle speed VehSpd [m/s] acquired from the vehicle speed sensor 90 is of a value in excess of a threshold value Gvs [m/s], and a required output (required driving force) ReqPwrVeh [W] (step S1) of a vehicle 13 is of a value in excess of a threshold value Gvp [W].

$$VehSpd > Gvs \ \& \ ReqPwrVeh > Gvp \tag{13}$$

In this case, in the case that at least one of the inequalities (conditions) of the left side or the right side of the "&" in formula (13) is not satisfied (step S3*k*: NO), then in step S3*l*, as shown in formula (14), the load correction amount CorDU of the load 20 of the engine 214 is set to CorDU [0]=0, and the correction (adjustment) is not implemented.

$$CorDU[i] = CorDU[0] = 0 \tag{14}$$

This is because, in a state in which the fuel cell vehicle 13 is stopped, such as during idling or the like, or alternatively, when traveling at a low speed [m/s] or the like which is less than or equal to the threshold value Gvs [m/s], since the generated electrical power Pfc generated by the FC system 218 (the FC stack 44) is small, even with such a correction (adjustment), it is difficult to obtain in a short time period an effect of the correction (adjustment), or stated otherwise, an effect of reducing the residual amount of fuel in the fuel tanks 40, 250, 260, 340, 350, and 360.

On the other hand, under a condition of "step S3$k$: YES", then in step S3$m$, as shown in formula (15), the load correction amount CorDU[i] in order to implement the adjustment (correction) of the required load output, which is the electrical power consumption amount of the load 20, is calculated.

$$CorDU[i] = CorDU[0] \qquad (15)$$
$$= CorOutBank[0]$$

In the first instance of step S3$m$, the correction (adjustment) corresponding to the correction amount CorOutBank set in step S3$i$ or step S3$j$ is placed in a state that is capable of being implemented with respect to the load 20 of the engine 214 designated by the index i=0.

In actuality, at this time, substantially simultaneously therewith, the correction (adjustment) corresponding to the correction amount CorOutBank[1], which will be described next, is placed in a state that is capable of being implemented with respect to the load 120 of the other engine 314.

More specifically, in step S3$n$, while incrementing the index i by 1 in a manner so that i=i+1=1 (the engine 314), execution of the process is carried out from step S3$d$: YES→step S3$e$→step S3$f$ {correction amount CordH2SOC[1] of the residual amount of fuel}→step S3$g$ {auxiliary equipment output correction amount CorAux[1]=aveAux−AuxPwr[1]}→step S3$h$→(step S3$i$ or step S3$j$)→step S3$k$→(step S3$l$ or step S3$m$)→step S3$n$ (i=2)→step S3$d$ (where i=2 and b=2, i<b?): NO.

Accordingly, in the second instance of step S3$m$, the correction (adjustment) corresponding to the correction amount CorOutBank set in step S3$i$ or step S3$j$ is placed in a state that is capable of being implemented with respect to the load 120 of the engine 314 designated by the index i=1, whereupon the process proceeds to step S4 of FIG. 3.

In this case, for example, in the second instance of step S3$m$, the load correction amount CorDU[1] in order to implement the adjustment (correction) of the required load output, which is the electrical power consumption amount for the load 120, is calculated as shown in formula (16).

$$CorDU[i] = CorDU[1] \qquad (16)$$
$$= CorOutBank[1]$$

Next, in step S4 of FIG. 3, the index i is set to i=0 (the engine 214).

In step S5, a determination is made as to whether or not the index i is less than the engine number b (i<b).

In the first instance of the determination in step S5, since the inequality i<b (0<2) is established, step S5: YES, and thereafter, the first instance of steps Smod (step S9 to step S13) is performed.

In the process of the first instance of steps Smod (step S9 to step S13), there is included the processing content of reducing or eliminating the difference between the total residual amount of fuel in the tanks 40, 250, and 260 that supply the fuel gas to the FC stack 44 of the FC system 218 within the one engine 214, and the total residual amount of fuel in the tanks 340, 350, and 360 that supply the fuel gas to the FC stack 344 of the FC system 318, by correcting (adjusting) the generated electrical power (FC output) between the FC stacks 44 and 344 in a complementary (offsetting) manner.

Further, in the process of the second instance of steps Smod (step S9 to step S13), which will be discussed below, there is included the processing content of reducing or eliminating the difference between the total residual amount of fuel in the tanks 140, 450, and 460 that supply the fuel gas to the FC stack 144 of the FC system 418 within the other engine 314, and the total residual amount of fuel in the tanks 440, 550, and 560 that supply the fuel gas to the FC stack 544 of the FC system 518, by correcting (adjusting) the generated electrical power (FC output) between the FC stacks 144 and 544 in a complementary (offsetting) manner.

More specifically, in the process of step S9, within one engine, in order to quickly reduce the total residual amount of fuel of the fuel tanks 40, 250, and 260 by relatively increasing the generated electrical power of the one fuel cell system (for example, the fuel cell system 218) in which the residual amount of fuel in each of the three fuel tanks is large, while on the other hand, in order to delay the reduction in the total residual amount of fuel in the fuel tanks 340, 350, and 360 of the other fuel cell system (in this case, becoming the fuel cell system 318) in which the total residual amount of fuel is small, a process is carried out to relatively reduce the generated electrical power generated by the other fuel cell system 318.

Figure 6:
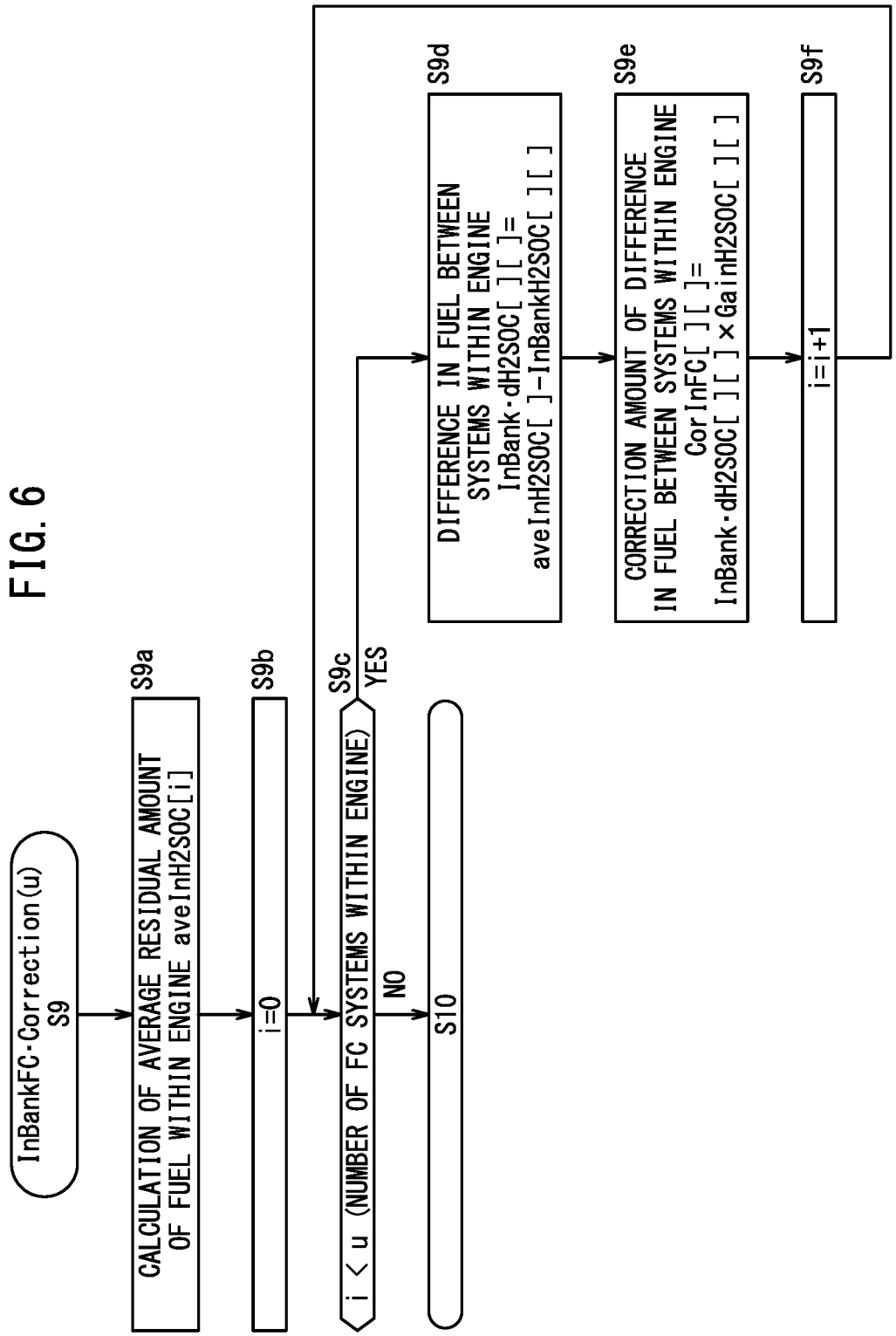
FIG. 6 is a flow chart showing details of a process of calculating a fuel cell output correction amount in order to reduce or eliminate a difference in the residual amount of fuel within the engines in step S9 of FIG. 3.

FIG. 6 is a detailed flow chart provided in relation to a process of calculating the FC output correction amount InBankFC•Correction(u) to cover the difference in the residual amount of fuel within the engine in step S9 of FIG. 3.

In the first instance of step S9$a$, an average residual amount of fuel within the engine aveInH2SOC[0] concerning the one engine 214 is calculated.

As shown in formula (17), the average residual amount of fuel within the engine aveInH2SOC[0] [Pa] of the one engine 214 is calculated as the average residual amount of fuel InBankH2SOC[0][0] [Pa] in the fuel tanks 40, 250, and 260 detected by the pressure sensor 41, and the residual amount of fuel InBankH2SOC[1][0] [Pa] in the fuel tanks 340, 350, and 360 detected by the pressure sensor 341.

$$aveInH2SOC[0]=(InBankH2SOC[0][0]+InBankH2SOC[1][0])/2 \qquad (17)$$

Next, in the first instance of step S9$b$, the index i is set to i=0 (the FC system 218 and the FC system 318 within the engine 214).

In the first instance of step S9$c$, a determination is made as to whether or not the index i is less than the number u of the FC systems within the engine (i<u) (where u is the number of the FC systems within the engine, u=2).

Since the determination in the first instance of step S9$c$ is affirmative (step S9$c$: YES), the process proceeds to the first instance of step S9$d$.

In the first instance of step S9$d$, the difference in the fuel between the systems within the engine InBank•dH2SOC[0][0] is calculated by formula (18). The difference InBank•dH2SOC[0][0] is a value that is obtained by subtracting the residual amount of fuel InBankH2SOC[0][0] [Pa] of the FC system 218 (the fuel tanks 40, 250, and 260) within the one engine 214, from the average residual amount of fuel within the engine aveInH2SOC[0] [Pa] of the engine 214.

$$\text{InBank}\cdot dH2SOC[0][0]=\text{aveInH2}SOC[0]-\text{InBankH2}SOC[0][0] \qquad (18)$$

In the first instance of step S9e, the FC output correction amount within the engine CorInFC[0][0] (units: [W]), which is a correction amount (adjustment amount) of the FC system 218 that covers (fills) the difference in the fuel between the systems within the engine InBank•dH2SOC[0][0], is calculated by formula (19).

$$\text{CorInFC}[0][0]=\text{InBank}\cdot dH2SOC[0][0]\times\text{GainH2}SOC[0][0] \qquad (19)$$

In this instance, the GainH2SOC[0][0] [W/Pa] is a corrective gain (conversion factor), and is a ratio ($\Delta$Pfc/$\Delta$H2) between a unit fuel increment $\Delta$H2 [Pa] of the fuel gas in the anode flow path within the FC stack 44, which is supplied from the fuel tanks 40, 250, and 260 through the pressure reducing valve 65, and a unit electrical power generation increment $\Delta$Pfc [W] of the FC stack 44. Such a ratio ($\Delta$Pfc/$\Delta$H2) is measured in advance as a characteristic (map) of an incremental function, and is recorded as a map in the storage device of the control device 30 (32).

Next, in the first instance of step S9f, the value of i is incremented by i=i+1=0+1, and the determination of the second instance of step S9c is carried out. In this case, since it is the second instance, and i<u is 1<2, the processes of the second instance of step S9d and the second instance of step S9e are performed again.

In the second instance of step S9d, the difference in the fuel between the systems within the engine InBank•dH2SOC[1][0] is calculated by formula (20). The difference InBank•dH2SOC[1][0] is a value that is obtained by subtracting the residual amount of fuel InBankH2SOC[1][0] of the FC system 318 (the fuel tanks 340, 350, and 360) within the one engine 214 from the average residual amount of fuel within the engine aveInH2SOC[0] of the engine 214.

$$\text{InBank}\cdot dH2SOC[1][0]=\text{aveInH2}SOC[0]-\text{InBankH2}SOC[1][0] \qquad (20)$$

In the second instance of step S9e, the FC output correction amount within the engine CorInFC[1][0] (units: [W]), which is a correction amount (adjustment amount) of the FC system 318 that covers (fills) the difference in the fuel between the systems within the engine InBank•dH2SOC[1][0], is calculated by formula (21).

$$\text{CorInFC}[1][0]=\text{InBank}\cdot dH2SOC[1][0]\times\text{GainH2}SOC[1][0] \qquad (21)$$

In this instance, the GainH2SOC[1][0] [W/Pa] is a corrective gain (conversion factor), and is a ratio ($\Delta$Pfc/$\Delta$H2) between a unit fuel increment $\Delta$H2 [Pa] of the fuel gas within the FC stack 344, which is supplied from the fuel tanks 340, 350, and 360, and a unit electrical power generation increment $\Delta$Pfc [W] of the FC stack 344. Such a ratio ($\Delta$Pfc/$\Delta$H2) also is measured in advance as a characteristic (map) of an incremental function, and is recorded as a map in the storage device of the control device 30 (32).

Next, in the second instance of step S9f, the value of i is incremented by i=i+1, and the determination of the third instance of step S9c is carried out. In the third instance of the determination, since i<u is negative (i=2, u=2) (step S9c:

NO), the process is brought to an end, and then the process proceeds to step S10 of FIG. 3.

Thereafter, in step S10, the index j in order to specify the FC system within the one engine 214 is set to the index j=0.

Next, the process is carried out from the first instance of step S11 (0<2): YES, the first instance of step S12, the first instance of step S13 (j=j+1=1), the second instance of step S11 (1<2): YES, the second instance of step S12, the second instance of step S13 (j=j+1=2), until the third instance of step S11 (j<u?, where j=2 and u=2): NO.

In this case, in the process of the first instance of step S12, the corrected FC output required value CorPwrFC[0][0] that is set in the one FC system 218 of the engine 214 is calculated by formula (22), and in the process of the second instance of step S12, the corrected FC output required value CorPwrFC[1][0] that is set in the other FC system 318 of the engine 214 is calculated by formula (23).

$$\text{CorPwrFC}[0][0]=\text{ReqPwrFC}[0][0]+\text{CorInFC}[0][0] \qquad (22)$$

$$\text{CorPwrFC}[1][0]=\text{ReqPwrFC}[1][0]+\text{CorInFC}[1][0] \qquad (23)$$

In this instance, the FC output correction amount within the engine CorInFC[0][0] and the FC output correction amount within the engine CorInFC[1][0] are values based on values obtained by having subtracted the total residual amount of fuel InBankH2SOC[0][0] of the fuel tanks 40, 250, and 260 or the total residual amount of fuel InBankH2SOC[1][0] of the fuel tanks 340, 350, and 360 from the average residual amount of fuel within the engine aveInH2SOC[0], and therefore, the magnitudes are the same and the positive and negative signs thereof are opposite.

In this case, since the correction in the residual amount of fuel between the FC systems 218 and 318 within the engine of the engine 214 is carried out by the generated electrical power Pfc1 generated by the FC system 218, and the generated electrical power Pfc2 generated by the FC system 318, the generated electrical power supplied to the load 20 through the lines 72 and 372, the integrated connector 24, and the line 80 does not change. More specifically, even though the residual amount of fuel correction process (the process of decreasing or eliminating the difference) between the FC system 218 and the FC system 318 is carried out, the input to the load 20 (the output of the load 20) does not change.

Next, in the first instance of step S6, the corrected engine output required value CorPwrDU[0] for the load 20 of the engine 214 is calculated by formula (24).

$$\text{CorPwrDU}[0]=\text{ReqPwrDU}[0]+\text{CorDU}[0] \qquad (24)$$

In formula (24), in order to correct (adjust) the difference in the residual amount of fuel between the fuel tanks 40 and 340 of the engines 214, the corrected engine output required value CorPwrDU[0] that is set for the load 20 of the engine 214 is calculated. The corrected engine output required value CorPwrDU[0] is a value obtained by adding the load correction amount CorDU[0] calculated in step S3m to the required output ReqPwrDU[0] for the load 20 calculated in step S2.

Next, in the first instance of step S7, the generated electrical output ReqPwrFC[0][0] of the FC system 218, the generated electrical output ReqPwrFC[1][0] of the FC system 318, and the electrical power storage output (battery output) ReqPwrBAT[0] of the BAT system 22 are recalculated, in order to cover the corrected engine output required value CorPwrDU[0] of the load 20 of the engine 214 in the first instance of step S6.

Next, in the first instance of step S8, when i=i+1=1, the determination (1<2) in step S5 becomes affirmative, and the process of the second instance of steps Smod (the process from step S9 to step S11: NO) is carried out.

In the second instance of step S9a of FIG. 6, an average residual amount of fuel within the engine aveInH2SOC[1] concerning the other engine 314 is calculated.

As shown in formula (25), the average residual amount of fuel within the engine aveInH2SOC[1] [Pa] of the other engine 314 is calculated as the average value of the total residual amount of fuel InBankH2SOC[0][1] [Pa] in the fuel tanks 140, 450, and 460 detected by the pressure sensor 141, and the total residual amount of fuel InBankH2SOC[1][1] [Pa] in the fuel tanks 440, 550, and 560 detected by the pressure sensor 441.

$$\text{aveInH2}SOC[1]=(\text{InBankH2}SOC[0][1]+\text{InBankH2}SOC[1][1])/2 \quad (25)$$

Next, in the second instance of step S9b, the index i is set to i=0. In this case, the determination (0<2) in the third instance of step S9c is affirmative (step S9c: YES), and the process proceeds to the third instance of step S9d.

In the third instance of step S9d, the difference in the fuel between the systems within the engine InBank•dH2SOC[0][1] is calculated by formula (26). The difference InBank•dH2SOC[0][1] is a value that is obtained by subtracting the residual amount of fuel InBankH2SOC[0][1] of the FC system 418 (the fuel tanks 140, 450, and 460) within the other engine 314 subtracted from the average residual amount of fuel within the engine aveInH2SOC[1] ([engine index]) [Pa] of the engine 314.

$$\text{InBank•}dH2SOC[0][1]\ ([FC\ system\ index][engine\ index])=\text{aveInH2}SOC[1]-\text{InBankH2}SOC[0][1] \quad (26)$$

In the third instance of step S9e, the FC output correction amount within the engine CorInFC[0][1] (units: [W]), which is a correction amount (adjustment amount) of the FC system 418 that covers (fills) the difference in the fuel between the systems within the engine InBank•dH2SOC[0][1], is calculated by formula (27).

$$\text{CorInFC}[0][1]=\text{InBank•}dH2SOC[0][1]\times\text{GainH2}SOC[0][1] \quad (27)$$

In this instance, the GainH2SOC[0][1] [W/Pa] is a corrective gain (conversion factor), and is a ratio ($\Delta$Pfc/$\Delta$H2) between a unit fuel increment $\Delta$H2 [Pa] of the fuel gas within the FC stack 144, which is supplied from the fuel tanks 140, 450, and 460 through the pressure reducing valve 165, and a unit electrical power generation increment $\Delta$Pfc [W] of the FC stack 144. Such a corrective gain is stored beforehand in the storage device of the control device 30 (132).

Next, in the third instance of step S9f, the value of i is incremented by i=i+1, and the determination of the fourth instance of step S9c is carried out. In this case, since it is the fourth instance, and i<u is 1<2, the processes of the fourth instance of step S9d and the fourth instance of step S9e are performed again.

In the fourth instance of step S9d, the difference in the fuel between the systems within the engine InBank•dH2SOC[1][1] is calculated by formula (28). The difference InBank•dH2SOC[1][1] is a value that is obtained by subtracting the total residual amount of fuel InBankH2SOC[1][1] of the FC system 518 (the fuel tanks 440, 550, and 560) within the other engine 314 subtracted from the average residual amount of fuel within the engine aveInH2SOC[1] of the engine 314.

$$\text{InBank•}dH2SOC[1][1]=\text{aveInH2}SOC[1]-\text{InBankH2}SOC[1][1] \quad (28)$$

In the fourth instance of step S9e, the FC output correction amount within the engine CorInFC[1][1] (units: [W]), which is a correction amount (adjustment amount) of the FC system 518 that covers (fills) the difference in the fuel between the systems within the engine InBank•dH2SOC[1][1], is calculated by formula (29).

$$\text{CorInFC}[1][1]=\text{InBank•}dH2SOC[1][1]\times\text{GainH2}SOC[1][1] \quad (29)$$

In this instance, the GainH2SOC[1][1] [W/Pa] is a corrective gain (conversion factor), and is a ratio ($\Delta$Pfc/$\Delta$H2) between a unit fuel increment $\Delta$H2 [Pa] of the fuel gas within the FC stack 544, which is supplied from the fuel tanks 440, 550, and 560 through the pressure reducing valve 565, and a unit electrical power generation increment $\Delta$Pfc [W] of the FC stack 544. Such a corrective gain is stored beforehand in the storage device of the control device 30 (132).

Next, in the fourth instance of step S9f, the value of i is incremented by i=i+1, and the determination of the fifth instance of step S9c is carried out. In the fifth instance of the determination, since i<u is negative (i=2, u=2), the process is brought to an end, and then the process proceeds to the second instance of step S10 of FIG. 3.

Thereafter, in step S10, the index j in order to specify the FC system within the other engine 314 is set to the index j=0.

Next, the process is carried out from the third instance of step S11 (0<2): YES, the third instance of step S12, the third instance of step S13 (j=j+1=1), the fourth instance of step S11 (1<2): YES, the fourth instance of step S12, the fourth instance of step S13 (j=j+1=2), until the fifth instance of step S11 (j<u?, where j=2 and u=2): NO.

In this case, in the process of the third instance of step S12, the corrected FC output required value CorPwrFC[0][1] that is set in the FC system 418 is calculated by formula (30), and in the process of the fourth instance of step S12, the corrected FC output required value CorPwrFC[1][1] that is set in the FC system 518 is calculated by formula (31).

$$\text{CorPwrFC}[0][1]=\text{ReqPwrFC}[0][1]+\text{CorInFC}[0][1] \quad (30)$$

$$\text{CorPwrFC}[1][1]=\text{ReqPwrFC}[1][1]+\text{CorInFC}[1][1] \quad (31)$$

In this instance, the FC output correction amount within the engine CorInFC[0][1] and the FC output correction amount within the engine CorInFC[1][1] are values based on values obtained by having subtracted the total residual amount of fuel InBankH2SOC[0][1] of the fuel tanks 140, 450, and 460 or the total residual amount of fuel InBankH2SOC[1][1] of the fuel tanks 440, 550, and 560 from the average residual amount of fuel within the engine aveInH2SOC[1], and therefore, the magnitudes are the same and the positive and negative signs thereof are opposite.

In this case, since the correction in the residual amount of fuel between the FC systems 418 and 518 within the engine of the engine 314 is carried out by the generated electrical power Pfc3 generated by the FC system 418, and the generated electrical power Pfc4 generated by the FC system 518, the generated electrical power supplied to the load 120 through the lines 172 and 572, the integrated connector 124, and the line 180 does not change. More specifically, even though the correction process of the residual amount of fuel (the process of decreasing or eliminating the difference) between the FC system 418 and the FC system 518 is carried out, the output of the load 120 does not change.

Next, in the second instance of step S6, the corrected engine output required value CorPwrDU[1] for the load 120 of the engine 314 is calculated by formula (32).

$$CorPwrDU[1]=ReqPwrDU[1]+CorDU[1] \quad (32)$$

In formula (32), in order to correct (adjust) the difference in the total residual amount of fuel between the fuel tanks 140, 450, and 460 and the fuel tanks 440, 550, and 560 of the engine 314, the corrected engine output required value CorPwrDU[1] that is set for the load 120 of the engine 314 is calculated. The corrected engine output required value CorPwrDU[1] is a value obtained by adding the load correction amount CorDU[1] calculated in the second instance of step S3*m* to the required output ReqPwrDU[1] for the load 120 calculated in step S2.

Next, in the second instance of step S7, the generated electrical output ReqPwrFC[0][1] of the FC system 418, the generated electrical output ReqPwrFC[1][1] of the FC system 518, and the electrical power storage output (battery output) ReqPwrBAT[1] of the BAT system 122 are recalculated, in order to cover the corrected engine output required value CorPwrDU[1] of the load 120 of the engine 314 in the second instance of step S6.

Next, in the second instance of step S8, when i=i+1=2, the determination (where i=2 and b=2, i<b?) in step S5 becomes negative (step S5: NO), and the setting process is brought to an end.

In actuality, after step S5: NO, the control device 30 sets and controls the load outputs of the loads 20 and 120 on the basis of the corrected engine output required value CorPwrDu[0] (formula (24)), and the corrected engine output required value CorPwrDu[1] (formula (32)) in step S6.

Simultaneously therewith, as shown below, by means of the recalculated values in step S7, the control device 30 controls the FC outputs of the FC systems 218, 318, 418, and 518 that cover the load outputs of the loads 20 and 120, and the BAT outputs of the BAT systems 22 and 122.

Summary of the Embodiment

During generation of electrical power (during the electrical power generating operation, which includes traveling and idling), in a manner so that the difference in the residual amount of fuel between the fuel tanks 40, 250, 260, 340, 350, and 360 of the fuel cell engine 214 and the fuel tanks 140, 450, 460, 440, 550, and 560 of the fuel cell engine 314 (|the total residual amount of fuel H2SOC[0] of the engine 214–the total residual amount of fuel H2SOC[1] of the engine 314|) becomes small, the generated electrical outputs (generated electrical powers) of the FC system 218 (the FC stack 44), the FC system 318 (the FC stack 344), the FC system 418 (the FC stack 144), and the FC system 518 (the FC stack 544) are corrected (adjusted), and the required output (electrical power consumption) ReqPwrDU[0] and the required output (electrical power consumption) ReqPwrDU[1] of the load 20 and the load 120 are corrected (adjusted).

In this case, in the engine 214 and the engine 314, a complementary control (one of the correction amounts and the other of the correction amounts have the same magnitude and opposite signs) of the correction amounts (adjustment amounts) is carried out in a manner so that the total generated electrical output of the FC systems 218, 318, 418, and 518 does not change. Further, a complementary control is similarly performed in a manner so that the total load output of the loads 20 and 120 does not change.

Thus, the difference in the total residual amount of fuel between the fuel tanks 40, 250, 260, 340, 350, and 360 and the fuel tanks 140, 450, 460, 440, 550, and 560 of the engine 214 and the engine 314 can be minimized over time, without changing the combined output (total output) of the output integration system 11 that covers the required output ReqPwrVeh of the fuel cell vehicle 13.

Further, the generated electrical outputs (generated electrical powers) of the FC system 218 (the FC stack 44), the FC system 318 (the FC stack 344), the FC system 418 (the FC stack 144), and the FC system 518 (the FC stack 544) are corrected (adjusted) in a manner so that, prior to carrying out the correction (adjustment) so that the difference in the residual amount of fuel (|total residual amount of fuel H2SOC[0] of the engine 214–total residual amount of fuel H2SOC[1] of the engine 314|) between the fuel tanks of the fuel cell engine 214 and the fuel cell engine 314 is reduced, the difference in the residual amount of fuel between the fuel tanks 40, 250, and 260 and the fuel tanks 340, 350, and 360 within the engine 214 and the difference in the residual amount of fuel between the fuel tanks 140, 450, and 460 and the fuel tanks 440, 550, and 560 within the engine 314 are reduced.

In accordance with such a correction (adjustment), it is possible to decrease or eliminate over time the difference in the residual amount of fuel in all of the fuel tanks 40, 250, 260, 340, 350, 360, 140, 450, 460, 440, 550, and 560.

Furthermore, simultaneously with performing the process of decreasing the difference in the residual amount of fuel over time, the auxiliary equipment output correction amounts CorAux[0] and CorAux[1] (complementary amounts having the same absolute value and opposite positive and negative values), which are differences aveAux–AuxPwr[0] and aveAux–AuxPwr[1] of the auxiliary equipment outputs AuxPwr[0] and AuxPwr[1] of the auxiliary equipment 28 and 128 subtracted from the auxiliary equipment output average value aveAux, are controlled in a manner so as to be added to the correction amount CordH2SOC of the residual amount of fuel.

Due to being controlled in this manner, the process of decreasing the difference in the residual amount of electrical power storage of the electrical power storage devices 50 and 150 over time can be carried out.

Moreover, it should be noted that, for example, at a time when the fuel cell vehicle 13 is idling or the like, the electrical power storage amount (the residual amount of electrical power storage) of the electrical power storage devices 50 and 150 can be increased by being charged with the generated electrical power Pfc of the FC systems 218, 318, 418, and 518, and can be maintained at a predetermined electrical power storage amount (SOC).

[Exemplary Modification]

The above-described embodiment can be modified in the following manner.

Figure 7:
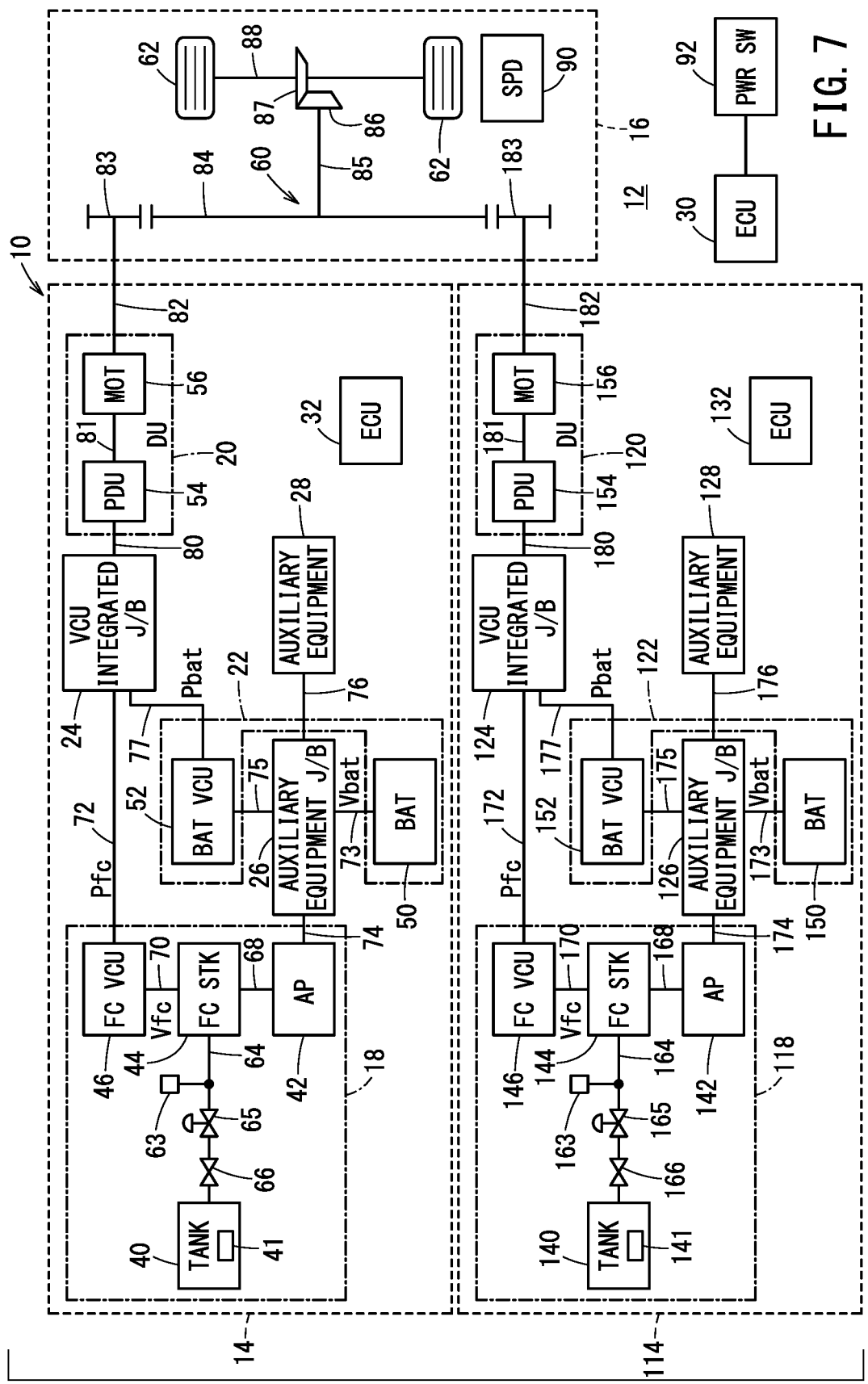
FIG. 7 is a schematic configuration diagram of a fuel cell vehicle according to an exemplary modification which is equipped with an output integration system for a fuel cell engine according to an exemplary modification.

FIG. 7 is a schematic configuration diagram of a fuel cell vehicle 12 according to an exemplary modification, which is equipped with an output integration system 10 according to the exemplary modification.

Moreover, in the fuel cell vehicle 12 according to the exemplary modification, which is equipped with the output integration system 10 according to the exemplary modification, the same reference numerals will be applied in relation to the same configurations or configurations corresponding to the output integration system 11 and the fuel cell vehicle 13 of the above-described embodiment, and only portions differing therefrom will be described.

As shown in FIG. 7, the output integration system 10 includes two FC engines 14 and 114.

As can be understood by comparing FIG. 7 and FIG. 1, the output integration system 10 according to the exemplary modification differs in comparison with the output integration system 11 according to the embodiment (see FIG. 1), in that the FC systems of the FC engines 14 and 114 are each constituted by one individual FC system 18 or 118, and the fuel tanks of the FC engines 14 and 114 are each constituted by one individual fuel tank 40 or 140.

The one FC engine 14 is equipped with one FC system 18, the BAT system 22, the load 20, the integrated connector 24, the auxiliary equipment connector 26, the auxiliary equipment 28, and the control device 32.

The other FC engine 114 is equipped with an FC system 118, the BAT system 122, the load 120, the integrated connector 124, the auxiliary equipment connector 126, the auxiliary equipment 128, and the control device 132.

In the one FC engine 14 and the other FC engine 114, the constituent elements thereof are the same except for the auxiliary equipment 28 and 128. In the auxiliary equipment 28 of the FC engine 14, there are included, for example, an in-vehicle air conditioner and an electric steering device, and in the auxiliary equipment 128 of the FC engine 114, differing from these features, there are included, for example, a heater for heating and a cargo compartment refrigerator.

The FC system 18 that constitutes the one FC engine 14 includes an FC stack 44. There are included therein an air pump 42 that communicates with a cathode inlet of this FC stack 44 through a passage 68, a fuel tank 40 that communicates with an anode inlet of the FC stack 44 through a passage 64, and an FC converter (FC VCU) 46 that is electrically connected through a line 70 between voltage output terminals of the FC stack 44. The output terminals of the FC converter 46 are electrically connected through a line 72 to the integrated connector 24.

A pressure sensor 41 that measures the pressure in the fuel tank 40 is attached to the fuel tank 40. Between the fuel tank 40 and the anode inlet of the FC stack 44, a valve 66, a pressure reducing valve 65, and a pressure sensor 63 are arranged in this order sequentially from the side of the fuel tank 40.

The BAT system 22 includes an electrical power storage device (battery: BAT) 50 and a BAT converter (also referred to as a BAT VCU) 52 which is a step-up/step-down converter.

A stored voltage Vbat of the electrical power storage device 50 passes through the line 73, the auxiliary equipment connector 26, and the line 75, and is supplied to the other input terminal of the integrated connector 24 via a line 77 as a high-voltage stored electrical power Pbat that is boosted in voltage through the BAT converter 52.

The load 20 comprises an inverter (also referred to as a PDU) 54 and a motor (MOT) 56 which is a main machine.

The generated electrical power Pfc generated by the FC stack 44 is supplied to the load 20 at a time of traveling or the like through the FC converter 46 and the integrated connector 24, and at a time of idling or the like of the FC system 18, the electrical power is stepped down by the BAT converter 52 through the integrated connector 24, and the stepped-down electrical power charges (stores electricity in) the electrical power storage device 50 through the auxiliary equipment connector 26.

Furthermore, at a time of decelerating when an accelerator pedal (not shown) of the fuel cell vehicle 12 is released, a regenerative electrical power of the motor 56 charges the electrical power storage device 50 through the inverter 54, the integrated connector 24, the BAT converter 52, and the auxiliary equipment connector 26.

The BAT converter 52 is a bi-directional converter that is capable of switching between supplying electrical power in a stepped-up direction from the electrical power storage device 50 to the load 20, and supplying electrical power in a stepped-down direction from the FC system 18 and/or the load 20 to the electrical power storage device 50.

The air pump 42 and the auxiliary equipment 28 are operated using the stored electrical power Pbat of the electrical power storage device 50 as input electrical power. In practice, the air pump 42 also operates as auxiliary equipment, and therefore, hereinafter, in the electrical power of the auxiliary equipment 28, the electrical power of the air pump 42 may also be included.

The FC system 118 that constitutes the other FC engine 114 includes an FC stack 144. There are included therein an air pump 142 that communicates with a cathode inlet of this FC stack 144 through a passage 168, a fuel tank 140 that communicates with an anode inlet of the FC stack 144 through a passage 164, and an FC converter 146 which is a voltage boosting converter that is electrically connected through a line 170 between voltage output terminals of the FC stack 144. The output terminals of the FC converter 146 are electrically connected through a line 172 to the integrated connector 124.

A pressure sensor 141 that measures the pressure in the fuel tank 140 is attached to the fuel tank 140. Between the fuel tank 140 and the anode inlet of the FC stack 144, a valve 166, a pressure reducing valve 165, and a pressure sensor 163 are arranged in this order sequentially from the side of the fuel tank 140.

The BAT system 122 that makes up the other engine 114 is equipped with an electrical power storage device 150 and a BAT converter 152.

The electrical power storage devices 50 and 150 may be secondary batteries such as lithium ion batteries and/or capacitors.

The load 120 that makes up the other engine 114 is equipped with the inverter 154 and the motor 156.

The propulsion mechanism 16, which is connected to the main shaft 82 of the motor 56 of the engine 14 and the main shaft 182 of the motor 156 of the engine 114, is equipped with the speed reducing mechanism 60 and the vehicle wheels 62.

The generated electrical power Pfc [W] and the stored electrical power Pbat [W] of each of the engines 14 (114) are supplied to the loads 20 (120), either separately or in an integrated (combined) manner through the integrated connectors 24 (124). The inverters 54 (154), at a time of so-called powered traveling, convert the DC electrical power into AC electrical power, and supply the same to the motors 56 (156).

The AC electrical power rotates the motors 56 (156), and the main shafts 82 (182) are rotationally driven.

The fuel cell vehicle 12 runs through the propulsion mechanism 16 due to a combined rotational driving force of the main shafts 82 (182) of the motors 56 (156) of the engines 14 (114).

In this case, the gear 83 (183) is enmeshed with the gear 84. The gear 84 is connected to the vehicle wheels 62 via a drive shaft 85, differential gears 86 and 87, and an axle 88.

The one engine 14 is equipped with a control device 32. The other engine 114 is equipped with a control device 132. The fuel cell vehicle 12 is equipped with a control device 30.

Each of the control devices 30, 32, and 132 is constituted, respectively, by an ECU (Electronic Control Unit). The ECU is a computer including a microcomputer, and includes a CPU (central processing unit) as a processor, a ROM (including an EEPROM) as a memory, a RAM (random access memory), and apart therefrom, input/output devices such as an A/D converter and a D/A converter, and a timer serving as a timekeeping unit. One or more of the CPUs, by reading out and executing programs stored in the ROM, functions as various function implementing units (function implementing means), for example, such as a control unit, a computation unit, and a processing unit. These functions can also be realized by hardware.

The control device 32 that controls the engine 14 is connected to each of the respective constituent elements that make up the engine 14 through non-illustrated signal lines and control lines. The control device 32, in addition to the pressure sensors 41 and 63, is connected to various sensors such as non-illustrated voltage sensors, current sensors, temperature sensors, and rotational speed sensors.

Similarly, the control device 132 that controls the engine 114 is connected to each of the respective constituent elements that make up the engine 114 through non-illustrated signal lines and control lines. The control device 132, in addition to the pressure sensors 141 and 163, is connected to various sensors such as non-illustrated pressure sensors, voltage sensors, current sensors, temperature sensors, and rotational speed sensors.

The control devices 32 and 132 are connected by communication lines (not shown) to the control device (also referred to as a supervisory control device) 30 that controls the output integration system 10 and the fuel cell vehicle 12, and are capable of sharing mutual data and calculation results in real time by way of communication.

The control device 30, in addition to being connected to the vehicle speed sensor 90 and a power switch (PWR SW) 92, which is a power source ON/OFF switch of the fuel cell vehicle 12, is also connected respectively to switch sensors such as a non-illustrated accelerator pedal sensor and a brake pedal sensor, together with being connected to the propulsion mechanism 16 and a non-illustrated electric power steering device or the like.

The control devices 32 and 132 and the control device 30 execute programs, and control the FC systems 18 and 118, the BAT systems 22 and 122, the auxiliary equipment 28 and 128, the integrated connectors 24 and 124, the auxiliary equipment connectors 26 and 126, and the loads 20 and 120, in accordance with the switched position of the switch, and the physical quantities detected by the sensors.

The control devices 32 and 132 may also be integrated together as one unit in the control device 30.

In order to avoid complexity and to facilitate understanding, in the following description, it is assumed that the output integration system 10 including the engines 14 and 114 and the fuel cell vehicle 12 which is equipped with the propulsion mechanism 16 are controlled by the integrated control device 30.

For example, the control device 30 is capable of setting the generated voltage Vfc (the generated current Ifc, the generated electrical power Pfc) of the FC stacks 44 (144) by controlling the FC converters 46 (146) on the basis of the stored voltage Vbat of the electrical power storage devices 50 (150).

[Operations of the Exemplary Modification]

Figure 8:
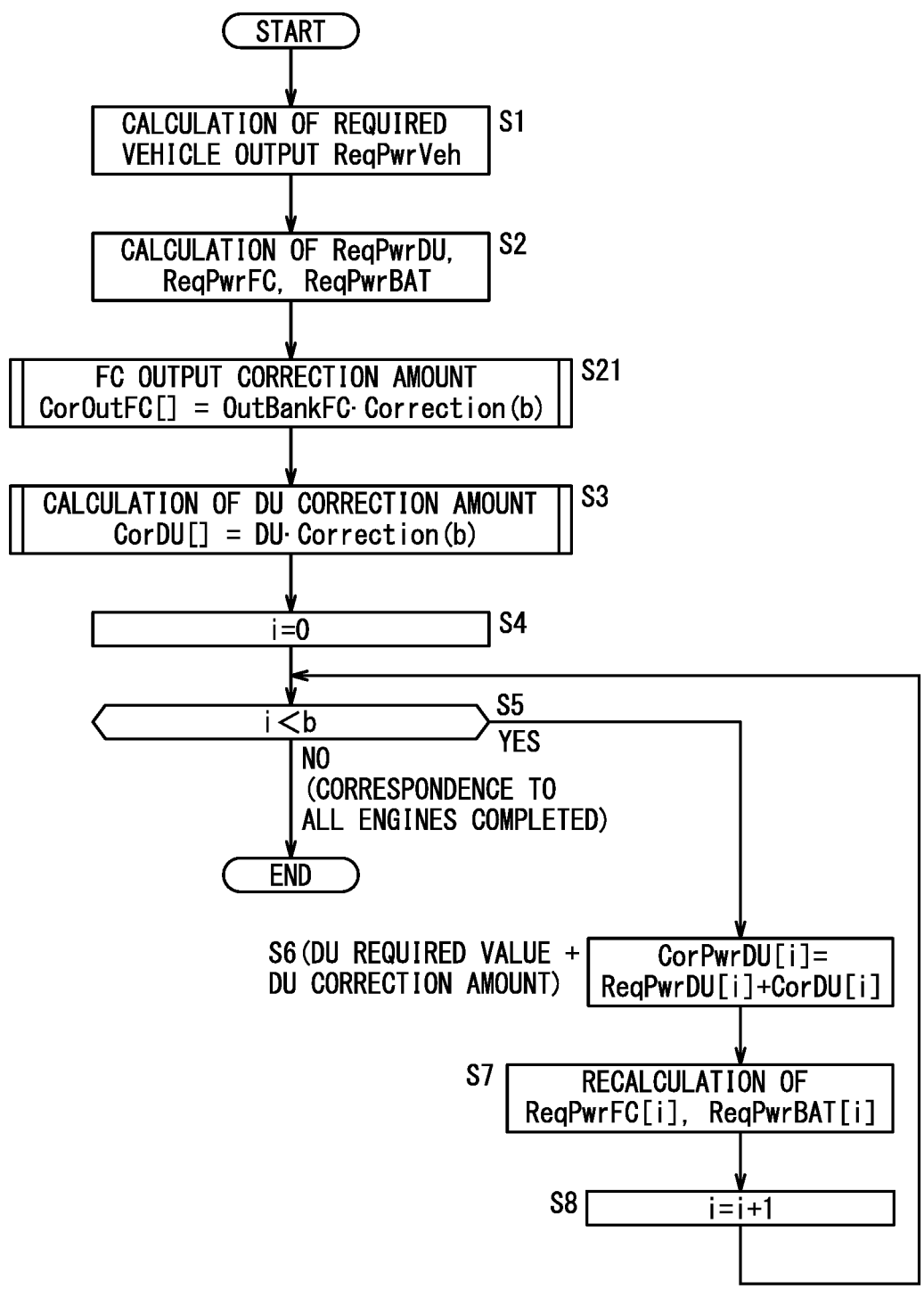
FIG. 8 is a flow chart provided in order to describe operations of the embodiment shown in FIG. 7.

A description will briefly be given following along with the flow chart of FIG. 8, concerning operations of the fuel cell vehicle 12 which is equipped with an output integration system 10 according to the exemplary modification. The flowchart of FIG. 8 is a flowchart in which the processes of steps Smod have been omitted from the flowchart of FIG. 3.

In step S1 of FIG. 8, the control device 30 calculates the required output (required vehicle output, required driving force, required vehicle driving force) ReqPwrVeh [W] of the propulsion mechanism 16 of the fuel cell vehicle 12. The required output ReqPwrVeh of the fuel cell vehicle 12 is calculated based on, for example, the current vehicle speed VehSpd as measured by the vehicle speed sensor 90, a slope of the road, and a target vehicle speed calculated from a degree of opening of the accelerator pedal or the like.

In step S2, as shown in the restated formula (1), the required output ReqPwrDU[0] for the load 20, and the required output ReqPwrDU[1] for the load 120 are calculated (distributed), in a manner so that the combined output (total output) of both of the engines 14 and 114 can cover the required output ReqPwrVeh [W] of the fuel cell vehicle 12.

$$\text{ReqPwrVeh} = \text{ReqPwrDU}[0] + \text{ReqPwrDU}[1] \tag{1}$$

In step S2, simultaneously, as shown in formula (33), the generated electrical output ReqPwrFC [0] of the FC system 18 and the required electrical power storage output ReqPwrBAT[0] of the BAT system 22, which cover the required output ReqPwrDU[0] [W] for the load 20, are calculated.

$$\text{ReqPwrDU}[0] = \text{ReqPwrFC}[0] + \text{ReqPwrBAT}[0] \tag{33}$$

At the same time, in step S2, as shown in formula (34), the required generated electrical output ReqPwrFC[1] of the FC system 118 and the required electrical power storage output ReqPwrBAT[1] of the BAT system 122, which cover the required output ReqPwrDU[1] [W] for the load 120, are calculated.

$$\text{ReqPwrDU}[1] = \text{ReqPwrFC}[1] + \text{ReqPwrBAT}[1] \tag{34}$$

Next, in step S21, a determination is made as to whether or not a correction process (FC output correction process) between the engines 14 and 114 is necessary in order to decrease or eliminate the difference in the residual amount of fuel between the residual amount of fuel in the fuel tank 40 of the engine 14, and the residual amount of fuel in the fuel tank 140 of the engine 114.

In order to perform this determination, an FC output correction amount OutBankFC•Correction(b) (where b is the number of the engines. In the exemplary modification, since there are the engine 14 and the engine 114, the number of the engines b is b=2), which is made up from the FC output correction amount CorOutFC[0] of the FC system 18 on the side of the engine 14 and the FC output correction amount CorOutFC[1] of the FC system 118 on the side of the engine 114, is calculated.

Moreover, the FC output correction process (the inter-engine FC output correction process) between the engines 14 and 114 is a process that is carried out in order to decrease or eliminate (equalize) a difference in the residual amount of fuel between the residual amount of fuel of the fuel tank 40 of the engine 14, and the residual amount of fuel in the fuel tank 140 of the engine 114 during generation of electrical power by the FC system 18 of the fuel cell vehicle 12, by correcting (adjusting) a distributed amount of the generated electrical power of the FC system 18 and the FC system 118.

To describe the inter-engine FC output correction process for the difference in the residual amount of fuel in step S21 in slightly greater detail, if from among both of the engines 14 and 114, one of the engines in which the residual amount of fuel remaining therein is large is assumed to be the engine 14, then in order to quickly reduce the residual amount of fuel in the fuel tank 40 of the one engine 14, there is a process of relatively increasing the generated electrical power (generated electrical output) Pfc (FC output ReqPwrFC[0]) of the fuel cell system 18 of the one engine 14 in which the total residual amount of fuel remaining therein is large, while on the other hand, in order to delay the reduction in the residual amount of fuel in the fuel tank 140 of the other engine 114 in which the residual amount of fuel is small, there is a process of relatively reducing the generated electrical power (FC output ReqPwrFC[1]) of the fuel cell system 118 of the other engine 114 in which the residual amount of fuel is small.

In the foregoing manner, by carrying out the control (process) on the generated electrical power Pfc=FC output ReqPwrFC[0] of the engine 14 and the generated electrical power Pfc=FC output ReqPwrFC[1] of the engine 114 in a complementary (offsetting) manner, the difference between the residual amount of fuel in the fuel tank 40 of the one engine 14 and the residual amount of fuel in the fuel tank 140 of the other engine 114 can be reduced over time.

The above-described FIG. 4 is a detailed flow chart provided in relation to a process, in step S21 of FIG. 8, of calculating the FC output correction amount CorOutFC[ ]=OutBankFC•Correction(b) (where b indicates the number of the engines) in order to correct (adjust) each of the generated electrical powers Pfc, which are output electrical powers of the fuel cell system 18 and the fuel cell system 118, for the purpose of reducing the difference in the residual amount of fuel (total residual amount of fuel) between the engines 14 and 114.

In step S21a of FIG. 4, the average value aveH2SOC [Pa] of the residual amount of fuel is calculated based on the pressure detected by the pressure sensor 41 {the residual amount of fuel H2SOC[0] (the residual amount of fuel of the engine 14)}, and the pressure detected by the pressure sensor 141 {the residual amount of fuel H2SOC[1] (the residual amount of fuel of the engine 114)}.

As shown in the restated formula (4), the average value aveH2SOC of the residual amount of fuel is calculated as an average value of the residual amount of fuel H2SOC[0] [Pa] in the fuel tank 40 of the engine 14, and the residual amount of fuel H2SOC[1] [Pa] in the fuel tank 140 of the engine 114.

$$aveH2SOC=(H2SOC[0]+H2SOC[1])/2 \tag{4}$$

In step S21b, from the detected values of the non-illustrated voltage sensors and the current sensors, the output AuxPwr[0] of the auxiliary equipment 28 of the engine 14, and the output AuxPwr[1] of the auxiliary equipment 128 of the engine 114 are acquired, and as shown in the restated formula (5), the average value aveAux [W] of the auxiliary equipment output, which is an average value, is calculated.

$$aveAux=(AuxPwr[0]+AuxPwr[1])/2 \tag{5}$$

In step S21c, the index i is set to i=0 (the engine 14).

In step S21d, a determination is made as to whether or not the index i is less than the number of engines b (i<b=2).

In the first instance of this determination, since (0<2), step S21d is affirmative (step S21d: YES), and the process proceeds to step S21e.

In step S21e, the difference in the residual amount of fuel dH2SOC [Pa] of the engine 14 whose index i is i=0 is calculated by the restated formula (6).

$$dH2SOC[0] = H2SOC[i] - aveH2SOC \tag{6}$$
$$= H2SOC[0] - aveH2SOC$$

Next, in step S21f, a correction amount CordH2SOC[0] [W] of the residual amount of fuel (adjustment amount of the residual amount of fuel) in order to correct (adjust) the difference in the residual amount of fuel dH2SOC[0] [Pa] calculated in step S21e by the fuel cell system 18 that makes up the engine 14 is calculated (converted) by the restated formula (7).

$$CordH2SOC[0]=dH2SOC \times GainH2SOC \tag{7}$$

In this instance, the GainH2SOC [W/Pa] is a corrective gain (conversion factor), and is a ratio ($\Delta$DU/$\Delta$H2) between a unit fuel increment $\Delta$H2 [Pa] of the fuel gas within the FC stack 44, which is supplied from the fuel tank 40 through the pressure reducing valve 65, and a unit output increment $\Delta$DU [W] for the load 20. Such a ratio ($\Delta$DU/$\Delta$H2) is measured in advance as a characteristic (map) of an incremental function, and is recorded as a map in the storage device of the control device 30 (32).

Next, in step S21g, the auxiliary equipment output correction amount CorAux[0] [W] of the auxiliary equipment 28 is calculated by the restated formula (8) as a difference in the auxiliary equipment output of the engine 14.

$$CorAux[0] = aveAux - AuxPwr[i] \tag{8}$$
$$= aveAux - AuxPwr[0]$$

Next, in step S21h, by means of the restated inequality (9), a determination is made as to whether or not the correction amount CordH2SOC[0] of the residual amount of fuel of the engine 14 is less than or equal to a predetermined threshold value Ghs [Pa].

$$CordH2SOC[0] \leq Ghs \tag{9}$$

In the case of being less than or equal to the threshold value Ghs (step S21h: YES), it is assumed that the correction amount CordH2SOC[0] of the residual amount of fuel is small, and the difference in the residual amount of fuel is small.

In this case, in step S21i, the correction amount CorOutBank[0] [W] of the engine 14 is set to only the auxiliary equipment output correction amount CorAux[0] with respect to the auxiliary equipment 28, as shown in the restated formula (10).

$$CorOutBank[0]=CorAux[0] \tag{10}$$

On the other hand, in the case of being greater than the threshold value Ghs (step S21h: NO), then in step S21j, the engine correction amount CorOutBank[0] [W] with respect to the engine 14 is set, as shown in the restated formula (11), to a value obtained by adding the auxiliary equipment output correction amount CorAux[0] with respect to the auxiliary equipment 28 calculated in step S21g, and the correction amount CordH2SOC[0] of the residual amount of fuel calculated in step S21f.

$$CorOutBank[0]=CorAux[0]+CordH2SOC[0] \tag{11}$$

More specifically, in the case that the correction amount CordH2SOC[0] of the residual amount of fuel exceeds the threshold value Ghs (step S21h: NO), the engine correction amount CorOutBank[0] is set to a total correction amount of the auxiliary equipment output correction amount CorAux [0] and the correction amount CordH2SOC[0] of the residual amount of fuel.

In actuality, at this time, substantially simultaneously therewith, the correction (adjustment) of the correction amount CorOutBank[1], which will be described next, is placed in a state that is capable of being implemented with respect to the fuel cell system 118 of the other engine 114.

More specifically, in step S21k, while incrementing the index i by 1 in a manner so that i=i+1=0+1=1 (the engine 114), execution of the process in relation to the side of the engine 114 is carried out from step S21d: (1<2): YES→step S21e→step S21f {correction amount CordH2SOC[1] of the residual amount of fuel}→step S21g {auxiliary equipment output correction amount CorAux[1]=aveAux−AuxPwr[1]}→step S21h→(step S21i or step S21j). In accordance with this feature, in step S21j, the engine correction amount CorOutBank[1] [W] with respect to the engine 114 is calculated as shown in the restated formula (12).

$$CorOutBank[1]=CorAux[1]+CordH2SOC[1] \quad (12)$$

Next, when (i=2) is set in step S21k, the determination of step S21d (where i=2 and b=2, i<b?) becomes negative (step S21d: NO), and the process proceeds to step S3 of FIG. 8.

Next, in step S3 of FIG. 8, with respect to the required outputs ReqPwrDU[0] and ReqPwrDU[1] of the loads 20 and 120, a determination is made as to whether or not a correction process (DU correction process) between the engines 14 and 114, which will be described next, is necessary. For this purpose, the load correction amount (also referred to as a DU correction amount) CorDU [W]=DU•Correction(b) (where b is the number of the engines, b=2 in the present embodiment) is calculated.

Moreover, the DU correction process between the engines 14 and 114 is a process that is carried out in order to eliminate or reduce (equalize) a difference between the residual amount of fuel in the fuel tank 40 of the engine 14 and the residual amount of fuel in the fuel tank 140 of the engine 114 during generation of electrical power by the FC systems 18 and 118 of the fuel cell vehicle 12, by correcting (adjusting) a distributed amount of the output electrical power for the loads 20 (120).

To describe the DU correction process between the engines 14 and 114 in slightly greater detail, within the engines 14 and 114, in order to quickly reduce the residual amount of fuel in the fuel tank of one of the engines in which the residual amount of fuel remaining therein is large, there is a process of relatively increasing the load (DU) output ReqPwrDU[ ] of the one engine in which the residual amount of fuel remaining therein is large, while on the other hand, in order to delay the reduction in the fuel of the fuel tank of the other engine in which the total residual amount of fuel is small, there is a process of relatively reducing the load (DU) output ReqPwrDU[ ] of the other engine in which the total residual amount of fuel is small.

In this manner, by controlling (processing) the load (DU) output ReqPwrDU[0] of the engine 14 and the load (DU) output ReqPwrDU[1] of the engine 114 in a complementary (offsetting) manner, a difference between the residual amount of fuel in the fuel tank (for example, the residual amount of fuel in the fuel tank 40) of the one engine, and the residual amount of fuel in the fuel tank (for example, the residual amount of fuel in the fuel tank 140) of the other engine can be reduced over time, while the combined output of the output integration system 10 (the required output ReqPwrVeh) remains unchanged (while being maintained at a constant value).

As was discussed previously, FIG. 5 is a detailed flow chart provided in relation to a process of calculating the load correction amount CorDU=DU•Correction(b) (b indicates the number of the engines) in order to correct (adjust) the output electrical power of the loads (DU) 20 (120), for the purpose of reducing the difference in the residual amount of fuel between the engines 14 and 114 in step S3 of FIG. 8.

In step S3a of FIG. 5, as shown in the restated formula (4), the average value aveH2SOC [Pa] of the residual amount of fuel is calculated based on the pressure detected by the pressure sensor 41 {the residual amount of fuel H2SOC[0] (the residual amount of fuel of the engine 14)}, and the pressure detected by the pressure sensor 141 {the residual amount of fuel H2SOC[1] (the residual amount of fuel of the engine 114)}.

$$aveH2SOC=(H2SOC[0]+H2SOC[1])/2 \quad (4)$$

In step S3b, in the same manner as in step S21b, from the detected values of the non-illustrated voltage sensors and the current sensors, the output AuxPwr[0] of the auxiliary equipment 28 of the engine 14, and the output AuxPwr[1] of the auxiliary equipment 128 of the engine 114 are acquired, and as shown in the restated formula (5), the average value aveAux [W] of the auxiliary equipment output, which is an average value, is calculated.

$$aveAux=(AuxPwr[0]+AuxPwr[1])/2 \quad (5)$$

In step S3c, the index i is set to i=0 (the engine 14).

In step S3d, a determination is made as to whether or not the index i is less than the engine number b (i<b).

In the first instance of this determination, since (0<2), step S3d is affirmative (step S3d: YES), and the process proceeds to step S3e.

In step S3e, the difference in the residual amount of fuel dH2SOC [Pa] of the engine 14 whose index i is i=0 is calculated by the restated formula (6).

$$dH2SOC[0] = H2SOC[i] - aveH2SOC \quad (6)$$
$$= H2SOC[0] - aveH2SOC$$

Next, in step S3f, a correction amount CordH2SOC[0] [W] of the residual amount of fuel (adjustment amount of the residual amount of fuel) in order to correct (adjust) the difference in the residual amount of fuel dH2SOC[0] [Pa] calculated in step S3e by the load 20 of the engine 14 is calculated (converted) by the restated formula (7).

$$CordH2SOC[0]=dH2SOC\times GainH2SOC \quad (7)$$

In this instance, the GainH2SOC [W/Pa] is a corrective gain (conversion factor), and is a ratio ($\Delta DU/\Delta H2$) between a unit fuel increment $\Delta H2$ [Pa] of the fuel gas within the FC stack 44, which is supplied from the fuel tank 40 through the pressure reducing valve 65, and a unit output increment $\Delta DU$ [W] for the load 20. Such a ratio ($\Delta DU/\Delta H2$) is measured in advance as a characteristic (map) of an incremental function, and is recorded as a map in the storage device of the control device 30 (32).

In order to facilitate understanding, such a ratio ($\Delta DU/\Delta H2$) shall be taken to be the same value as the ratio ($\Delta DU/\Delta H2$) in the aforementioned step S21f.

Next, in step S3g, in the same manner as in step S21g, the auxiliary equipment output correction amount CorAux[0] [W] of the auxiliary equipment 28 is calculated by the restated formula (8) as a difference in the auxiliary equipment output of the engine 14.

$$CorAux[0] = aveAux - AuxPwr[i] \quad (8)$$
$$= aveAux - AuxPwr[0]$$

Next, in step S3*h*, by means of the restated inequality (9), a determination is made as to whether or not the correction amount CordH2SOC of the residual amount of fuel is less than or equal to a predetermined threshold value Ghs [Pa].

$$CordH2SOC \leq Ghs \qquad (9)$$

In the case of being less than or equal to the threshold value Ghs (step S3*h*: YES), it is assumed that the correction amount CordH2SOC[0] of the residual amount of fuel is small, and the difference in the residual amount of fuel is small.

In this case, in step S3*i*, the correction amount CorOutBank[0] [W] of the engine 14 is set to only the auxiliary equipment output correction amount CorAux[0] with respect to the auxiliary equipment 28, as shown in the restated formula (10).

$$CorOutBank[0] = CorAux[0] \qquad (10)$$

On the other hand, in the case of being greater than the threshold value Ghs (step S3*h*: NO), then in step S3*j*, the engine correction amount CorOutBank[0] [W] with respect to the engine 14 is set, as shown in the restated formula (11), to a value obtained by adding the auxiliary equipment output correction amount CorAux[0] with respect to the auxiliary equipment 28 calculated in step S3*g*, and the correction amount CordH2SOC[0] of the residual amount of fuel calculated in step S3*f*.

$$CorOutBank[0] = CorAux[0] + CordH2SOC[0] \qquad (11)$$

More specifically, in the case that the correction amount CordH2SOC[0] of the residual amount of fuel exceeds the threshold value Ghs (step S3*h*: NO), the engine correction amount CorOutBank[0] is set to a total correction amount of the auxiliary equipment output correction amount CorAux[0] and the correction amount CordH2SOC[0] of the residual amount of fuel.

Next, in step S3*k*, as shown in the restated formula (13), a determination is made as to whether or not the vehicle speed VehSpd [m/s] acquired from the vehicle speed sensor 90 is of a value in excess of a threshold value Gvs [m/s], and a required output (required driving force) ReqPwrVeh [W] (step S1) of the vehicle 12 is of a value in excess of a threshold value Gvp [W].

$$VehSpd > Gvs \ \& \ ReqPwrVeh > Gvp \qquad (13)$$

In this case, in the case that at least one of the inequalities (conditions) of the left side or the right side of the "&" in formula (13) is not satisfied (step S3*k*: NO), then in step S3*l*, as shown in the restated formula (14), the load correction amount CorDU of the load 20 of the engine 14 is set to CorDU[0]=0, and the correction (adjustment) is not implemented.

$$CorDU[i] = CorDU[0] = 0 \qquad (14)$$

This is because, in a state in which the fuel cell vehicle 12 is stopped, such as during idling or the like, or alternatively, when traveling at a low speed [m/s] or the like which is less than or equal to the threshold value Gvs [m/s], since the generated electrical power Pfc generated by the FC system 18 (the FC stack 44) is small, even with such a correction (adjustment), it is difficult to obtain in a short time period an effect of the correction (adjustment), or stated otherwise, an effect of reducing the residual amount of fuel in the fuel tank 40.

On the other hand, under a condition of "step S3*k*: YES", then in step S3*m*, as shown in the restated formula (15), the load correction amount CorDU[i] in order to implement the adjustment (correction) of the required load output, which is the electrical power consumption amount of the load 20, is calculated.

$$CorDU[i] = CorDU[0] \qquad (15)$$
$$= CorOutBank[0]$$

In the first instance of step S3*m*, the correction (adjustment) corresponding to the correction amount CorOutBank set in step S3*i* or step S3*j* is placed in a state that is capable of being implemented with respect to the load 20 of the engine 14 designated by the index i=0.

In actuality, at this time, substantially simultaneously therewith, the correction (adjustment) corresponding to the correction amount CorOutBank[1], which will be described next, is placed in a state that is capable of being implemented with respect to the load 120 of the other engine 114.

More specifically, in step S3*n*, while incrementing the index i by 1 in a manner so that i=i+1=1 (the engine 114), execution of the process is carried out from step S3*d*: YES→step S3*e*→step S3*f* {correction amount CordH2SOC [1] of the residual amount of fuel}→step S3*g* {auxiliary equipment output correction amount CorAux[1]=aveAux–AuxPwr[1]}→step S3*h*→(step S3*i* or step S3*j*)→step S3*k*→ (step S3*l* or step S3*m*)→step S3*n* (i=2)→step S3*d* (where i=2 and b=2, i<b?): NO.

Accordingly, in the second instance of step S3*m*, the correction (adjustment) corresponding to the correction amount CorOutBank set in step S3*i* or step S3*j* is placed in a state that is capable of being implemented with respect to the load 120 of the engine 114 designated by the index i=1, whereupon the process proceeds to step S4 of FIG. 8.

In this case, for example, in the second instance of step S3*m*, the load correction amount CorDU[1] in order to implement the adjustment (correction) of the required load output, which is the electrical power consumption amount for the load 120, is calculated as shown in the restated formula (16).

$$CorDU[i] = CorDU[1] \qquad (16)$$
$$= CorOutBank[1]$$

Next, in step S4 of FIG. 8, the index i is set to i=0 (the engine 14).

In step S5, a determination is made as to whether or not the index i is less than the number of engines b (i<b).

In the first instance of the determination in step S5, since i<b (0<2) is established, step S5: YES is brought about, and next, the process proceeds to step S6.

Next, in the first instance of step S6, the corrected engine output required value CorPwrDU[0] for the load 20 of the engine 14 is calculated by the restated formula (24).

$$CorPwrDU[0] = ReqPwrDU[0] + CorDU[0] \qquad (24)$$

In formula (24), in order to correct (adjust) the difference in the residual amount of fuel between the fuel tanks 40 and 140 of the engines 14 and 114, the corrected engine output required value CorPwrDU[0] that is set for the load 20 of the engine 14 is calculated. The corrected engine output required value CorPwrDU[0] is a value obtained by adding the load correction amount CorDU[0] calculated in step S3$m$ to the required output ReqPwrDU[0] for the load 20 calculated in step S2.

Next, in the first instance of step S7, the generated electrical output ReqPwrFC[0] of the FC system 18, which covers the corrected engine output required value CorPwrDU[0] for the load 20 of the engine 14 in the first instance of step S6, and the electrical power storage output (battery output) ReqPwrBAT[0] of the BAT system 22 are recalculated.

Next, in the first instance of step S8, when i=i+1=1, the determination (1<2) in step S5 becomes affirmative, and the process of the second instance of step S6 is carried out.

Next, in the second instance of step S6, the corrected engine output required value CorPwrDU[1] for the load 120 of the engine 114 is calculated by the restated formula (32).

$$CorPwrDU[1]=ReqPwrDU[1]+CorDU[1] \qquad (32)$$

In formula (24), in order to correct (adjust) the difference in the residual amount of fuel between the fuel tanks 40 and 140 of the engines 14 and 114, the corrected engine output required value CorPwrDU[1] that is set for the load 120 of the engine 114 is calculated. The corrected engine output required value CorPwrDU[1] is a value obtained by adding the load correction amount CorDU[1] calculated in the second instance of step S3$m$ to the required output ReqPwrDU[1] for the load 120 calculated in step S2.

Next, in the second instance of step S7, the generated electrical output ReqPwrFC[1] of the FC system 118 and the electrical power storage output (battery output) ReqPwrBAT[1] of the BAT system 122, which cover the required output CorPwrDU[1] for the load 120 of the engine 114 in the second instance of step S6, are recalculated.

Next, in the second instance of step S8, when i=i+1=2, the determination (where i=2 and b=2, i<b?) in step S5 becomes negative (step S5: NO), and the setting process is brought to an end.

In actuality, after step S5: NO, the control device 30 sets and controls the load outputs of the loads 20 and 120 on the basis of the corrected engine output required value CorPwrDu[0] (formula (24)), and the corrected engine output required value CorPwrDu[1] (formula (24)) in step S6.

Simultaneously therewith, as shown below, by means of the recalculated values in step S7, the control device 30 controls the FC outputs of the FC systems 18 and 118 that cover the load outputs of the loads 20 and 120, and the BAT outputs of the BAT systems 22 and 122.

[Invention that can be Grasped from the Embodiment and the Exemplary Modification]

In this instance, the invention that is capable of being grasped from the above-described embodiment and the above-described exemplary modification will be described below. Moreover, in order to facilitate understanding, although the reference numerals used in the above-described embodiment and the above-described exemplary modification are applied to portions of the constituent elements, such constituent elements are not limited to those to which such reference numerals have been applied.

The output integration system 10 according to the present invention is the output integration system 10 for the plurality of fuel cell engines 14 and 114, and is configured to integrate the outputs from the plurality of fuel cell engines 14 and 114, wherein each of the fuel cell engines includes the fuel cell stack 44 or 144, the fuel tank 40 or 140 configured to store the fuel gas supplied to the fuel cell stack, and the load 20 or 120 configured to be supplied with electrical power from the fuel cell stack and to generate the driving force, and the output integration system includes the control device 30, 32, or 132 provided at the interior or the exterior of the fuel cell engines, and wherein the control device acquires the difference in the residual amount of fuel in the fuel tanks 40 and 140 between the plurality of fuel cell engines 14 and 114, and adjusts the generated electrical output of each of the fuel cell stacks 44 and 144, so as to reduce the difference.

In this manner, the generated electrical output of the fuel cell stacks 44 and 144 is adjusted, in a manner so that the difference in the residual amount of fuel in the fuel tanks between the fuel cell engines 14 and 114 is reduced.

Therefore, the residual amount of fuel in the fuel tanks 40 and 140 of each of the fuel cell engines 14 and 114 can be equalized. In accordance with this feature, the operable time period of the output integration system 10 made up of the plurality of fuel cell engines 14 and 114 can be lengthened.

Further, in the output integration system 10, the control device 30 sets the difference in the residual amount of fuel in the fuel tanks between the plurality of fuel cell engines 14 and 114 to a value obtained by subtracting the average value of the residual amounts of fuel in the respective fuel cell engines from the residual amount of fuel in each of the fuel cell engines.

In accordance with such a configuration, since the required generated electrical power amount of the fuel cell stack of the fuel cell engine in which the residual amount of fuel is large is adjusted so as to be increased, the required generated electrical power amount of the fuel cell stack of the fuel cell engine in which the residual amount of fuel is small is adjusted so as to be decreased, and the total value of the adjustment amount becomes zero, even if the adjustment to reduce the difference in the residual amount of fuel between the engines is performed, the overall output of the output integration system 10 does not change.

Furthermore, in the output integration system 11, in the case that each of the fuel cell engines 214 (314) includes the plurality of the fuel cell stacks 44 and 344 (144 and 544), and that the fuel cell stacks are supplied with the fuel gas from the fuel tanks 40, 250, 260, 340, 350, and 360 (140, 450, 460, 440, 550, and 560) which are configured to communicate respectively with the fuel cell stacks, the control device 30 may acquire the difference in the residual amount of fuel between the fuel tanks from among the plurality of the fuel cell stacks within each of the fuel cell engines, and may adjust the generated electrical output of each of the fuel cell stacks within each of the fuel cell engines, so as to reduce the difference.

In accordance with such a configuration, equalization of the total residual amount of fuel of the fuel tanks 40, 250, 260, 340, 350, and 360 and the fuel tanks 140, 450, 460, 440, 550, and 560 between the fuel cell engines 214 and 314 is carried out, together with carrying out equalization of the residual amount of fuel in the fuel tanks 40, 250, and 260 and the fuel tanks 340, 350, and 360, and equalization of the residual amount of fuel in the fuel tanks 140, 450, and 460 and the fuel tanks 440, 550, and 560 within the respective fuel cell engines 214 and 314.

Therefore, it is possible to equalize the residual amount of fuel in all of the fuel tanks 40, 250, 260, 340, 350, 360, 140, 450, 460, 440, 550, and 560 that constitute the output integration system 11. In accordance with this feature, the operable time period of the output integration system 11 can be lengthened.

Further still, in the output integration system 10 or 11, each of the fuel cell engines may include the electrical power storage device 50 or 150 configured to discharge or charge the electrical power between the fuel cell stack and the load, and the control device may adjust the electrical power consumption amount of the load, so as to suppress the charging or discharging amount of the electrical power storage device by adjusting the generated electrical output of each of the fuel cell stacks.

In this manner, in the case of adjusting the residual amount of fuel in the fuel tanks in accordance with the generated electrical output, the electrical power consumption amount of the load is controlled in a manner so as to suppress the charging and discharging amount in order to avoid complications in controlling the charging and discharging amount of the electrical power storage device. Consequently, it is possible to appropriately control the amount of electrical power stored in the electrical power storage device while equalizing the residual amount of fuel in the fuel tanks.

Further still, in the output integration system 10 or 11, in the case that a request for the driving force with respect to the loads exceeds a predetermined value, the control device may adjust the generated electrical output of each of the fuel cell stacks, and adjust a required load output, which is an electrical power consumption amount of each of the loads, so as to reduce the difference in the residual amount of fuel in the fuel tanks between the plurality of fuel cell engines, and in the case that a request for the driving force with respect to the loads is less than or equal to the predetermined value, the control device, without adjusting the required load output, may adjust only the generated electrical output of each of the fuel cell stacks.

In the case that the required load output is less than or equal to a predetermined value, although it is difficult to perform a control in a manner so that the difference in the residual amount of fuel between the fuel cell engines is reduced by adjusting the required load output which is the electrical power consumption amount of the respective loads, even in this case, by adjusting the generated electrical output between the fuel cell stacks, it is possible to reduce or eliminate the difference in the residual amount of fuel in the fuel tanks.

Further still, in the fuel cell vehicle 12 or 13 in which the output integration system 10 or 11 is installed, and including the traction motor 56 or 156 as the load, the fuel cell vehicle may include the vehicle speed acquisition unit (the vehicle speed sensor 90) configured to acquire the vehicle speed of the fuel cell vehicle, and the required electrical power acquisition unit (step S1) configured to acquire the required electrical power of the traction motor, wherein, in the case that the vehicle speed is in excess of the threshold vehicle speed, and the required electrical power is greater than or equal to the threshold required electrical power, the control device, by adjusting the required electrical power of the loads and the generated electrical power generated by the fuel cell stacks, may reduce or eliminate the difference in the residual amount of fuel between the plurality of fuel cell engines, and in the case that the vehicle speed is less than the threshold vehicle speed, or the required electrical power is less than the threshold required electrical power, the control device, only by adjusting the generated electrical power of the fuel cell stacks, may reduce or eliminate the difference in the residual amount of fuel between the plurality of fuel cell engines.

In accordance with such features, the residual amount of fuel in the fuel tanks of each of the fuel cell engines can be equalized over the entire vehicle speed range including at a time when the fuel cell vehicle 12 or 13 is idling.

Moreover, the present invention is not limited to the embodiment described above, and without deviating from the essence and gist of the present invention, various alternative or additional configurations can be adopted therein. For example, the number of the engines may be greater than or equal to three, or the number of the fuel cell stacks within the engines may be greater than or equal to three, and the like.

What is claimed is:

1. An output integration system for a plurality of fuel cell engines, the output integration system configured to integrate outputs from the plurality of fuel cell engines, the output integration system comprising one or more processors that are provided at an interior or an exterior of the fuel cell engines and execute computer-executable instructions stored in a memory, wherein each of the fuel cell engines comprises:
a fuel cell stack;
a fuel tank configured to store a fuel gas supplied to the fuel cell stack; and
a load configured to be supplied with electrical power from the fuel cell stack, and to generate a driving force, and wherein the one or more processors execute the computer-executable instructions to cause the output integration system to:
acquire a difference in a residual amount of fuel in the fuel tanks between the plurality of fuel cell engines; and
adjust a generated electrical output of each of the fuel cell stacks, so as to reduce the difference, wherein in a case that a request for the driving force with respect to the loads exceeds a predetermined value, the one or more processors execute the computer-executable instructions to cause the output integration system to adjust the generated electrical output of each of the fuel cell stacks, and adjust a required load output, which is an electrical power consumption amount of each of the loads, so as to reduce the difference in the residual amount of fuel in the fuel tanks between the plurality of fuel cell engines; and wherein in a case that the request for the driving force with respect to the loads is less than or equal to the predetermined value, the one or more processors execute the computer-executable instructions to cause the output integration system to, without adjusting the required load output, adjust only the generated electrical output of each of the fuel cell stacks.

2. The output integration system according to claim 1, wherein the one or more processors execute the computer-executable instructions to cause the output integration system to set the difference in the residual amount of fuel in the fuel tanks between the plurality of fuel cell engines to a value obtained by subtracting an average value of the residual amounts of fuel in the respective fuel cell engines from the residual amount of fuel in each of the fuel cell engines.

3. The output integration system according to claim 1, wherein:
each of the fuel cell engines includes a plurality of the fuel cell stacks, and the fuel cell stacks are supplied with the fuel gas from the fuel tanks which are configured to communicate respectively with the fuel cell stacks; and
the one or more processors execute the computer-executable instructions to cause the output integration system to acquire a difference in the residual amount of fuel between the fuel tanks from among the plurality of the fuel cell stacks within each of the fuel cell engines, and adjust the generated electrical output of each of the fuel cell stacks within each of the fuel cell engines, so as to reduce the difference.

4. The output integration system according to claim 2, wherein:
each of the fuel cell engines includes a plurality of the fuel cell stacks, and the fuel cell stacks are supplied with the fuel gas from the fuel tanks which are configured to communicate respectively with the fuel cell stacks; and
the one or more processors execute the computer-executable instructions to cause the output integration system to acquire a difference in the residual amount of fuel between the fuel tanks from among the plurality of the fuel cell stacks within each of the fuel cell engines, and adjust the generated electrical output of each of the fuel cell stacks within each of the fuel cell engines, so as to reduce the difference.

5. The output integration system according to claim 1, wherein:
each of the fuel cell engines includes an electrical power storage device configured to discharge or charge electrical power between the fuel cell stack and the load; and
the one or more processors execute the computer-executable instructions to cause the output integration system to adjust an electrical power consumption amount of the load, so as to suppress a charging or discharging amount of the electrical power storage device by adjusting the generated electrical output of each of the fuel cell stacks.

6. The output integration system according to claim 2, wherein:
each of the fuel cell engines includes an electrical power storage device configured to discharge or charge electrical power between the fuel cell stack and the load; and
the one or more processors execute the computer-executable instructions to cause the output integration system to adjust an electrical power consumption amount of the load, so as to suppress a charging or discharging amount of the electrical power storage device by adjusting the generated electrical output of each of the fuel cell stacks.

7. A fuel cell vehicle in which an output integration system for a plurality of fuel cell engines is installed, and including a traction motor as a load, the fuel cell vehicle comprising:

a vehicle speed acquisition unit configured to acquire a vehicle speed of the fuel cell vehicle,
wherein the output integration system is configured to integrate outputs from the plurality of fuel cell engines, and the output integration system comprises one or more processors that are provided at an interior or an exterior of the fuel cell engines and execute computer-executable instructions stored in a memory,
wherein each of the fuel cell engines comprises:
a fuel cell stack;
a fuel tank configured to store a fuel gas supplied to the fuel cell stack; and
the load configured to be supplied with electrical power from the fuel cell stack, and to generate a driving force, and
wherein the one or more processors execute the computer-executable instructions to cause the output integration system to:
acquire a required electrical power of the traction motor;
in a case that a request for the driving force with respect to the loads exceeds a predetermined value, adjust the generated electrical output of each of the fuel cell stacks, and adjust a required load output, which is an electrical power consumption amount of each of the loads, so as to reduce the difference in the residual amount of fuel in the fuel tanks between the plurality of fuel cell engines;
in a case that the request for the driving force with respect to the loads is less than or equal to the predetermined value, without adjusting the required load output, adjust only the generated electrical output of each of the fuel cell stacks;
in a case that the vehicle speed is in excess of a threshold vehicle speed, and the required electrical power is greater than or equal to a threshold required electrical power, by adjusting the required electrical power of the loads and the generated electrical power generated by the fuel cell stacks, reduce or eliminate the difference in the residual amount of fuel between the plurality of fuel cell engines; and
in a case that the vehicle speed is less than the threshold vehicle speed, or the required electrical power is less than the threshold required electrical power, only by adjusting the generated electrical power of the fuel cell stacks, reduce or eliminate the difference in the residual amount of fuel between the plurality of fuel cell engines.

\* \* \* \* \*